(12) United States Patent  
Perlmutter et al.

(10) Patent No.: US 8,194,939 B2  
(45) Date of Patent: Jun. 5, 2012

(54) USING RELEVANCE FEEDBACK IN FACE RECOGNITION

(75) Inventors: Keren O. Perlmutter, Pacific Palisades, CA (US); Sharon M. Perlmutter, Pacific Palisades, CA (US); Joshua Alspector, South Riding, VA (US); Mark Everingham, Oxford (GB); Alex Holub, Pasadena, CA (US); Andrew Zisserman, Jericho (GB); Pietro Perona, Altadena, CA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 12/849,134

(22) Filed: Aug. 3, 2010

(65) Prior Publication Data

US 2011/0085710 A1    Apr. 14, 2011

Related U.S. Application Data

(63) Continuation of application No. 11/382,671, filed on May 10, 2006, now Pat. No. 7,783,085.

(51) Int. Cl.  
*G06K 9/00* (2006.01)

(52) U.S. Cl. ......... 382/118; 382/305; 382/224; 382/190

(58) Field of Classification Search .................... 382/118  
See application file for complete search history.

(56) References Cited

U.S. PATENT DOCUMENTS

| | | | |
|---|---|---|---|
| 5,642,431 A | 6/1997 | Poggio et al. | |
| 5,850,470 A | 12/1998 | Kung et al. | |
| 5,893,095 A | 4/1999 | Jain et al. | |
| 6,222,939 B1 | 4/2001 | Wiskott et al. | |
| 6,480,840 B2 * | 11/2002 | Zhu et al. | ........................... 1/1 |
| 6,563,950 B1 | 5/2003 | Wiskott et al. | |
| 6,574,632 B2 | 6/2003 | Fox et al. | |
| 6,832,006 B2 | 12/2004 | Savakis et al. | |
| 7,106,903 B2 | 9/2006 | Chang et al. | |
| 2004/0264780 A1 | 12/2004 | Zhang et al. | |
| 2005/0084154 A1 | 4/2005 | Li et al. | |
| 2005/0226509 A1 | 10/2005 | Maurer et al. | |
| 2006/0251292 A1 | 11/2006 | Gokturk et al. | |

OTHER PUBLICATIONS

Li et al., "IRM: Integrated region matching for image retrieval," 2000, ACM, 1-58113-198-4, pp. 147-156.

Office Action issued in U.S. Appl. No. 11/382,657 mailed May 8, 2009, 32 pages.

Scholkopf et al., "Comparing Support Vector Machines with Gaussian Kernels to Radial Basis Function Classifiers," Nov. 1997, IEEE Transactions on Signal Processing, vol. 45, No. II, pp. 2758-2765.

(Continued)

*Primary Examiner* — Samir Ahmed  
*Assistant Examiner* — Ruiping Li  
(74) *Attorney, Agent, or Firm* — Finnegan, Henderson, Farabow, Garrett & Dunner, LLP

(57) ABSTRACT

Images are searched to locate faces that are the same as a query face. Images that include a face that is the same as the query face may be presented to a user as search result images. Images also may be sorted by the faces included in the images and presented to the user as sorted search result images. The user may provide explicit or implicit feedback regarding the search result images. Additional feedback may be inferred regarding the search result images based on the user-provided feedback, and the results may be updated based on the user-provided and inferred feedback.

45 Claims, 21 Drawing Sheets

OTHER PUBLICATIONS

PCT International Search Report and Written Opinion issued Dec. 10, 2008, in International Application No. PCT/US07/68647, 12 pages.

K. Porkaew et al: "Query refinement for multimedia similarity retrieval in MARS", ICMCS, pp. 747-751, 1999.

A. Holub, M. Everingham, A. Zisserman and P. Perona, "Towards Finding Perceptually Similar Faces", Visions Science Society, 1 page, May 10, 2005.

B.T. Bartell, G.W. Cottrell, and R.K. Belew, "Optimizing Similarity Using Multi-Query Relevance Feedback", Journal of the American Society for Information Science, 49(8) 742-761, Jun. 1998.

M. Steyvers and T.A. Busey, "Predicting Similarity Ratings to Faces Using Physical Descriptions," in "Computational, Geometric, and Process Perspectives on Facial Cognition: Context and Challenges," M.J. Wenger and J.T. Townsend eds., Mahwah, New Jersey, pp. 116-145, 2001.

M. Turk and A. Pentland, "Eigenfaces for Recognition", Journal of Cognitive Neuroscience, vol. 3, No. 1, pp. 71-86, Winter 1991.

U. Gargi, Y. Deng, and D.R. Tretter, "Managing and Searching Personal Photo Collections", Hewlett-Packard Laboratories, Palo Alto, California, 9 pages, Mar. 18, 2002, available at http://www.hpl.hp.com/techreports/2002/HPL-2002-67.html.

P.C. Yuen and C.H. Man, "Enhanced Human Face Image Searching System using Relevance Feedback," Proceedings of the Sixth IEEE International Conference on Automatic Face and Gesture Recognition (FGR '04), 6 pages, 2004.

I. Cohen, G. Ashutosh, T.S. Huang, "Vision-Based Overhead View Person Recognition", Proceedings of the 15th International Conference on Pattern Recognition, Barcelona, Spain, pp. 1119-1124, 2000.

L. Zhang, L. Chen, M. Li, and H. Zhang, "Bayesian Face Annotation in Family Albums", Proceedings of the. International Conference on Computer Vision (ICCV), Nice, France, 2 pages, 2003, available at http://research.microsoft.com/en-us/um/people/leizhang/Paper/ICCV03Demo.pdf.

M. Everingham and A. Zisserman, "Regression and Classification Approaches to Eye Localization in Face Images", Proceedings of the 7th International Conference on Automatic Face and Gesture Recognition (FGR '06), Washington, D.C., pp. 441-448, Apr. 10, 2006, available at http://www.fg2006.ecs.sotion.ac.uk/.

"Fujifilm Displays Face Recognition and Detection Ability; Available in New Electronic Photo Album", DigitalCameraInfo.com, pp. 1-6, Oct. 20, 2005, available at http://www.digitalcamerainfo.com/content/Fujifilm-Displays-Face-Recognition-and-Detection-Ability-Available-in-new-Electronic-Photo-Book.htm.

"Riya Eases Pain of Pile of Pix", Wired News, 4 pages, Nov. 11, 2005, available at http://www.wired.com/news/print/0,1294,69514,00.html.

* cited by examiner

USING RELEVANCE FEEDBACK IN FACE RECOGNITION

CROSS REFERENCE TO RELATED APPLICATIONS

This application is a continuation of U.S. patent application Ser. No. 11/382,671, filed May 10, 2006 now U.S. Pat. No. 7,783,085, which was allowed on Apr. 14, 2010. The disclosure of the above-referenced application is hereby incorporated by reference to its entirety.

GOVERNMENT SUPPORT STATEMENT

This invention was made with government support under Grant No. EEC9402726 awarded by The National Science Foundation. The government has certain rights in the invention.

TECHNICAL FIELD

This description relates to recognizing faces within images.

BACKGROUND

Images in an electronic photograph album may be organized based on tags associated with the images, such as, for example, date and time stamps. A user also may manually organize images in an electronic photograph album around a theme, such as, for example, a particular event at which the images were taken.

SUMMARY

In one aspect, faces within images are recognized. At least one query face is accessed. A set of search result images are determined. A search result image includes an application-selected face that is determined to be the same as the query face. An indication of the search result images is provided to a user. Feedback related to the accuracy of the search result images is received. Additional feedback is inferred based on the received feedback. The set of search result images is updated based on the received feedback and the inferred additional feedback.

Implementations may include one or more of the following features. For example, a query feature vector may be created for the query face. A set of search feature vectors may be formed by creating one or more search feature vectors for faces within a set of search faces. Distances between the query feature vector and the search feature vectors may be determined. One or more search feature vectors that are within a selected distance of the query feature vector may be selected. Images that include faces that correspond to the selected search feature vectors may be designated as the set of search result images.

A class for the query face may be detected. Faces in a set of faces that have the same class as the query face may be determined. The set of search feature vectors may be formed by selecting feature vectors that correspond to the determined faces.

A weighted Euclidean distance between the query feature vector and each of the search feature vectors may be determined.

The query face may be located within a query image. Facial features of the query face may be detected. The query face may be warped based on the detected facial features. Information regarding the detected facial features may be extracted from the warped face. The query feature vector may be formed based on the extracted information.

Non-face based features may be detected from the query image. Information regarding the non-face based features may be extracted from the query image. The query feature vector may be formed based on the extracted information regarding the detected non-face based features and the extracted information regarding the detected facial features.

Multiple query faces may be accessed. A query feature vector may be created for each of the multiple query faces. Distances between the multiple query feature vectors and the search feature vectors may be determined.

Negative faces that are determined to not be the same as the query face may be identified. Negative feature vectors may be created for the negative faces. Multiple query faces may be accessed. A query feature vector may be created for each of the multiple faces. Distances between the multiple query feature vectors and the search feature vectors may be determined and distances between the negative feature vectors and the search feature vectors also may be determined.

The inferred additional feedback may include information about faces in the search result images other than the application-selected face. The inferred additional feedback may include information about faces in the search result images other than a face selected by the user as being the same as the query face. The feedback related to the accuracy of the search result images may include positive feedback or negative feedback.

A set of images that include faces that have not been labeled may be accessed. The set of images may be sorted into groups based on the faces within the images. The images in a group may include faces that are determined to be the same. The query face may be accessed after the set of images have been sorted. The query face may be a face that is included in an image in one of the groups.

The search result images may be images within an online photograph album. The indication of the search result images provided to the user may be an indication that the search result images have been associated with the query image, where the query image is a labeled image. The indication of the search result images provided to the user may include the search result images.

The search result images may include images within a social network.

In another aspect, a system includes a feature extractor, a feature classifier, an interface manager, and a feedback manager. The feature extractor is configured to access at least one query image that includes at least one query face, create a query feature vector for the query face, and form a set of search feature vectors by creating one or more search feature vectors for faces within a set of search faces. The face classifier is configured to determine distances between the query feature vector and the search feature vectors, select one or more search feature vectors that are within a selected distance of the query face feature vector, and designate images that include faces that correspond to the selected search feature vectors as a set of search result images. The interface manager is configured to provide an indication of the search result images to a user, and receive feedback related to the accuracy of the search result images. The feedback manager is configured to infer additional feedback based on the received feedback. In addition, the face classifier is configured to update the set of search result images based on the received feedback and the inferred additional feedback.

Implementations of any of the techniques described may include a method or process, an apparatus or system, or computer software on a computer-useable medium. The details of particular implementations are set forth below. Other features will be apparent from the description and drawings, and from the claims.

DETAILED DESCRIPTION

Figure 1:
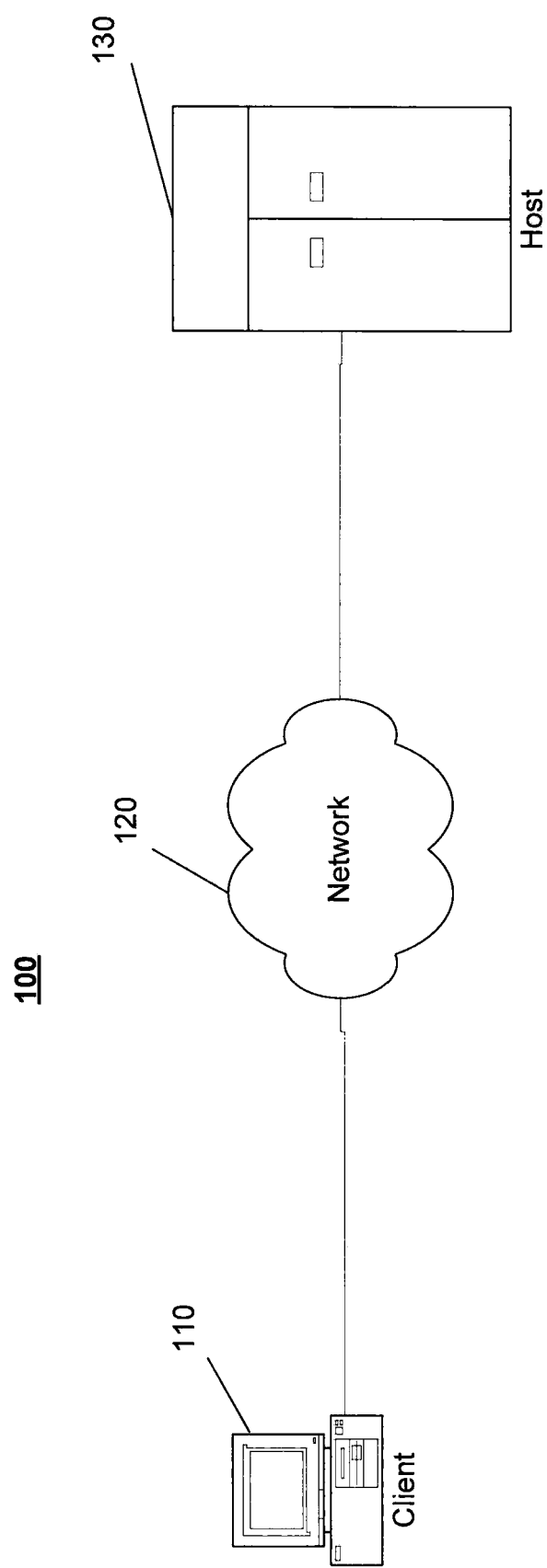
FIG. 1 is a block diagram showing an example of a communications system.

The following discussion describes techniques for finding faces, within a set of faces that are the same as a query face. Such techniques may be useful in a number of applications. For example, a user may store a collection of photographs, or images, in an online photo album. A user also may have access to images related to a social network. Furthermore, a user may have access to a collection of photographs or images stored on a physical hard drive, a virtual hard drive or some other storage medium, such as, for example, a memory card or stick for a digital camera. The images may be pictures of people, such that the images include faces. The user may search the images for particular faces and/or the images also may be sorted by faces included in the images.

For example, a photo album of a user may include a large number of images. A first image may include a face belonging to person A, a second image may include a face belonging to person B, and a third image may include faces belonging to both person A and person B. The user may search the photo album for images that include person A. The face of person A may be referred to as a query face or a positive query face because it is a face for which a match is sought. In response, the user may be presented with the first and third images as search result images. For example, the first and third images may be directly presented as viewable to the user or may be placed in a folder that includes other images that contain person A.

In another example, the images in the photo album may be sorted, and placed, for example, in folders within the photo album, by the faces within the images. In the present example, upon uploading to the photo album a set of images that contain faces that have not been sorted or labeled, or in response to a user indication to initiate sorting of a set of images that contain faces that have not been sorted or labeled, a folder may be created for each face recognized in the images. For example, a folder may be created for each of person A and person B. The user then may label the folders, and thus the faces within the folders, with the name of a person to whom the faces within a folder correspond.

After the initial sorting, or clustering, and labeling of the images in the photo album, additional images may be automatically sorted into folders and labeled. A face within an already sorted and labeled image may be referred to as a query face because it is a face for which matches are sought out of the unlabeled or unsorted faces. For example, a user may upload additional images to the photo album. The additional images to be placed in folders may include one or more faces that are, as of yet, unknown (i.e., unlabeled). Techniques are then applied to recognize whether the additional images contain faces that are the same as the query faces for which folders have already been created, and the images may be automatically sorted into the appropriate folders. In other words, the unknown (or unlabeled) faces are tested against the query faces (sorted and/or labeled faces) to determine if any of the unknown faces are a match for one or more query faces. If a particular unknown face is a match for a query face, the image that contains the unknown face may be placed in the folder to which the query face belongs. For example, if the three images described above are unknown images that include unknown faces, the first and third images may be analyzed to recognize that the images contain person A and then may be placed in the person A folder. Similarly, the second and third images may be analyzed and placed in the person B folder. The third image may appear in both the person A and person B folders because the third image includes faces belonging to both person A and person B.

Upon receiving images that have been returned in response to a search, or sorted into folders, techniques may be provided to receive feedback from a user regarding the results of the searching or sorting. The user may provide positive feedback by indicating that a returned image does include a face that is the same as the face for which the user was searching (i.e., the query face), or that a sorted image does include a face that is the same as other faces within a folder that have been explicitly or implicitly confirmed by the user (i.e., the query faces) into which the sorted image has been placed. Similarly, the user may provide negative feedback by indicating that a returned image does not include a face that is the same as the face for which the user was searching (i.e., the query face), or that a sorted image does not include a face that is the same as other faces within the folder that have been explicitly or implicitly confirmed by the user (i.e., the query faces) into which the sorted image has been placed.

Positive or negative feedback may be provided by a user explicitly or implicitly. For example, an image may be returned as a search result image for a query face and a face within the search result image may be identified as a match for the query face. The face selected as the match may be referred to as the application-selected face. Explicit feedback may be provided when a user explicitly indicates that the application-selected face is, or is not, a match for the query face. The user may provide the explicit feedback by, for example, answering questions posed about the returned search result image and the application-selected face. In another example, the user may provide explicit feedback by moving a sorted image to a different folder from the one into which the image has been automatically sorted. If the user explicitly indicates that the application-selected face is a match for the query face, the user has explicitly provided positive feedback. Similarly, if the user explicitly indicates that the application-selected face is not a match for the query face the user has explicitly provided negative feedback.

Implicit feedback may be provided when a user interacts or does not interact with a search result image, or the application-selected face within a search result image, in a way that provides information about whether the application-selected face is, or is not, a match for the query face. For example, a user may choose to print a particular search result image. In another example, a search result image may be sorted into a folder corresponding to person A because the application-selected face within the image has been recognized as person A. If a user agrees that the application-selected face is, in fact, person A, the user may simply leave the image within the person A folder to indicate positive feedback about the application-selected face. In other words, a user may provide user feedback by not engaging in any interaction with the sorted search result image. In both scenarios, although the user has not explicitly indicated that the search result image or the application-selected face includes a match for the query face, the user's actions may indicate that the user is satisfied with the search result image (e.g., the search result image does, in fact, include a match for the query face). By implicitly indicating that the application-selected face is a match for the query face, the user has implicitly provided positive feedback. Similarly, a user can interact with a search result image in a way that implies that the application-selected face is not a match for the query face. For example, in response to a request to indicate all search result images that contain an application-selected face that is a match for a query face, a user may fail to interact with a particular search result image. Thus, by not indicating that the particular search result image includes a correctly identified application-selected face, the user has implicitly provided negative feedback about the application-selected face within the particular search result image.

Techniques also are described for inferring additional information about faces within an image based on explicit and implicit feedback provided for the image by a user. For example, a user may provide implicit or explicit positive feedback for a search result image, which includes two faces, to indicate that the application-selected face is a match for the query face. From the positive feedback provided by the user, it may be inferred that the other face within the image (i.e., the face other than the application-selected face) is not a match for the query face. This is the case because, generally only one face in a given image may be a match for a particular query face. In addition, if the user does not indicate that the other face is a match for the query face, the assumption may be considered confirmed. In another example, a user may explicitly or implicitly indicate that although the application-selected face is not a match for the query face, another face within the image, which includes, for example, three faces, is a match for the query face. The face within the image that the user indicates is a match for the query face may be referred to as a user-selected face. In this case, from the user's positive feedback about the user-selected face, it may be inferred that all other faces within the image (i.e., all faces other than the user-selected face, including the application-selected face) are not a match for the query face.

Thus, in general, explicit feedback may be provided when a user directly and explicitly indicates that an application-selected face is, or is not, a match for the query face. Implicit feedback may be provided when a user interacts with a search result image in a natural manner, or fails to interact with a sorted search result image, in a manner that implies that the application-selected face is, or is not, a match for the query face. In contrast, inferred additional feedback is a form of extra information that may be determined for the other faces within a search result image for which the user has not provided explicit or implicit feedback.

Obtaining information related to whether an application-selected face is, in fact, a match for a query face may be advantageous in that updated search results or sorting may be provided in response to positive and/or negative feedback and better future search results or sorting may be provided in response to both positive and/or negative feedback. Furthermore, inferring feedback also may allow a user to interact with a search result image in a natural manner, while allowing additional information (i.e., information in addition to the information explicitly or implicitly provided by the user's actions) about the accuracy of the search results to be inferred without requiring any extra effort or action on the part of the user. For example, a user naturally may print a search result image that includes a face sought by the user, thus indicating that the application-selected face is a match for the query face, but at the same time, the user may be providing important feedback about faces other than the application-selected face in the image the user is printing, e.g., that the faces other than the application-selected face are not matches for the query face. In another example, a user naturally may not interact with a sorted search result image if the image has been sorted correctly.

Moreover, feedback provided by a user both explicitly and implicitly may be used to infer additional feedback beyond any feedback indicated based on a user's interaction with a search result image. For example, when a user implicitly indicates that an application-selected face is a match for the query face (e.g., by printing the search result image or not interacting with a correctly sorted search result image), without any additional interaction by the user with the search result image, it may be inferred that the other faces within the search result image are not a match for the query face. Similarly, if a user explicitly indicates that an application-selected face is not a match for the query face, and the user does not interact in any way with the other faces within the search result image, it may be inferred that other faces within the search result image also are not a match for the query face. This inferred additional negative feedback also may be used to improve the accuracy of updated, and future, search results or sorting.

FIG. 1 is a block diagram showing an example of a communications system 100 that includes a client 110 connected to a host 130 through a network 120. In general, the host 130 may be configured to access a query face, use a face-recognition algorithm to search for images, among images referred to as search images, that include a face that is the same as the query face and send the images having a face that is the same as the query face to the client 110 for display. The host 130 also may be configured to receive user feedback from client 110 and infer additional feedback based on the received user feedback.

Each of the client 110 and the host 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110 and host 130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 110 or the host 130.

The network 120 includes hardware and/or software capable of enabling direct or indirect communications between the client 110 and the host 130. As such, the network 120 may include a direct link between the client 110 and the host 130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

In one implementation, the client 110 includes one or more client applications (e.g., a web browser, a mail application, an instant messaging client, an Internet service provider client, a media player, or another client application) capable of receiving one or more data units. The client applications may run on a general-purpose operating system and a hardware platform that includes a general-purpose processor and specialized hardware for graphics, communications and/or other capabilities. In another implementation, the client 110 may include a wireless telephone, or personal digital assistant (PDA), running a micro-browser application on an embedded operating system with general purpose and specialized hardware capable of operating in mobile environments.

In general, the client 110 may present one or more user interfaces (UIs) that enable a user to search for faces that are the same as a query face and provide feedback regarding images provided as search result images. Additionally, or alternatively, the client 110 may present one or more UIs that enable a user to sort images based on the faces in the images and to provide feedback regarding the results of the sorting. The UIs may be rendered on client 110, for example, as part of a so-called thick client application, or may be rendered by a so-called thin client application, such as a web browser. For example, the UIs may be one or more web pages rendered by a web browser. In some implementations, the UIs may relate to an online photo album and/or a social network service.

More particularly, client 110 may be configured to receive a query face from a user and transmit this information to host 130. To do so, client 110 may present one or more UIs that allow a user to select, or designate, a query image that includes a query face and initiate a search for images that include faces that are the same as the query face. Client 110 then may provide the query face to host 130. The user may enter a query face by using the UI to upload an image that includes the query face or to select an image that includes the query face and resides on the Internet or another network. For example, the UI may allow the user to select a query image that is stored in an online database, in an online photograph album, or on a website. In other implementations, the query face(s) may be images already uploaded to the host 130 and sorted and/or labeled. Thus, in general, a query image may contain face(s) that the user specifically wants to search for or may be one or more images that have been sorted and/or labeled according to the faces within the images.

Client 110 may be configured to receive from host 130 an indication of search result images that include faces that are the same as the query face. Client 110 also may be configured to receive and present the search result images to the user by displaying the search result images in a UI. Additionally, client 110 may be configured to receive feedback from the user regarding the results (e.g., whether the search result images do, in fact, include a face that is the same as the query face). Client 110 may transmit the user feedback to host 130.

The host 130 generally includes one or more devices configured to receive a query face from client 110. Host 130 also may be configured to use a face-recognition algorithm to search images for faces that are the same as the query face and to appropriately sort and/or return, to client 110, the images that include a face that is a match for the query face. Host 130 also may be configured to receive user feedback from host 130 and use the received user feedback to infer additional feedback regarding the search or sorting results. Host 130 may be configured to refine searching or sorting in accordance with the received and inferred user feedback.

Figure 2:
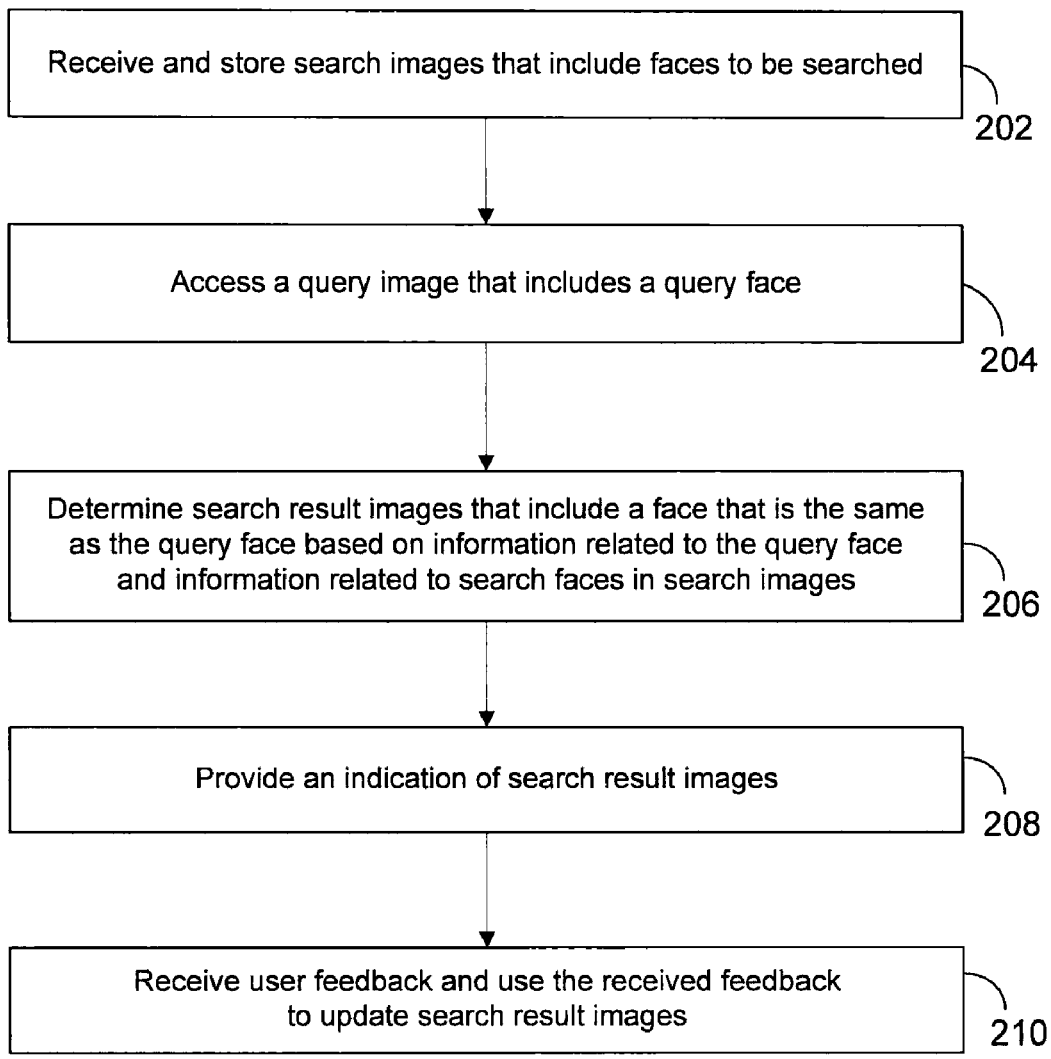
FIG. 2 is a flow chart illustrating an example of a general process for searching for images that include a face that is the same as a query face, providing search result images to a user, and receiving user feedback regarding the search result images.

FIG. 2 is a flow chart illustrating an example of a general process 200 for searching for images that include a face that is the same as a query face, providing search result images to a user, and receiving user feedback regarding the search result images.

Generally, the operations of process 200 may be used in conjunction with the systems and configurations described with respect to FIG. 1. For example, process 200 may be performed by a cooperation between host 130 and client 110. However, similar methodologies may be applied in other implementations where different components are used to define the structure of the system, or where the functionality is distributed differently among the components shown. For example, all components may reside on client 110 and all processes may be performed by client 110 rather than host 130.

Host 130 receives and stores search images that include faces to be searched for matches to a query face (referred to as search faces) (202). The search images may be received by host 130 from client 110. Client 110 may receive the search images from a user and the search images may be photographs that were uploaded by a user to an online photo album. The photographs may be images that include faces.

Host 130 accesses a query image that includes a query face (204). The query image may be an image that includes a face that the user specifically wants to search for or may be a face in one or more images that have been sorted and/or labeled according to the faces within the images. The user may provide the query image by uploading the image or selecting the image from a collection of images in, for example, an online photo album. Furthermore, if the query image includes more than one face, the user may indicate which face is the query face. To do so, the user may select a face within the query image using a pointing device (such as, for example, a mouse or stylus). In some implementations, all faces within the query image may be detected and presented to the user for selection as the query face. The user may also select the query face by using a drop-down menu, a radio button, a checkbox or some other input.

Host 130 determines search result images that include a face that is the same as the query face based on information related to the query face and information related to search faces in the search images (206). In general, search images that include search faces that are determined to be the same as the query face may be designated as search result images. Host 130 may be configured to use a face-recognition algorithm to compare the query face with the search faces in the search images to detect one or more matches. The information related to the query face and the search faces used by the face-recognition algorithm may include feature vectors formed for the query and search faces, as described in detail below.

Host 130 provides an indication of search result images to client 110 (208). The host 130 may provide the indication of search result images to client 110, such that the search result images are displayed by client 110 to the user who requested the search and provided the query image. The face determined by host 130 to be the same as the query face may be referred to as an application-selected face. The application-selected face may be identified either within the search result image by, for example, a circle or square drawn around the application-selected face or an arrow pointing at the application-selected face, or in conjunction with the search result image by, for example, a text block or pop-up indicating that, for example, the left-most face is the application-selected face.

Each image generally has only one application-selected face for a particular person. It is assumed that when a search is initiated to find a face that is the same as a query face, the search is being made to find other images that include the same person. Because a single person generally does not appear in an image more than once, an image that includes that person generally may only include one face (of many, if the image includes more than one face) that is a match to the query face. Thus, each image typically has only one application-selected face.

In addition, if more than one query face is provided, where each query face relates to a different person, then a search result image may include more than one application-selected face such that each application-selected face relates to a different person. For example, if two query faces are provided, a search result image that includes (at least) two faces may include one face that is the same as one of the query faces and another face that is the same as the other query face. Thus, the search result image may include more than one application-selected face.

Host 130 receives user feedback from client 110 and uses the received feedback to update the search result images (210). The user feedback received by host 130 may include positive and negative feedback obtained by client 110 from the user's explicit or implicit interactions with the search result images. For example, positive implicit feedback may be provided if a user selects a search result image for printing or, in a sorting implementation, leaves a correctly sorted search result image in a particular folder within the user's photo album. This type of interaction may be the basis for positive feedback because the user's interaction with the search result image indicates that the user agrees that the search result image includes a face that is the same as the query face. Similarly, negative implicit feedback may be indicated if a user interacts with a search result image in a way that indicates that the user does not agree that the search result image includes a face that is the same as the query face. For example, a user may be asked to indicate all search result images that contain correctly identified application-selected faces. If a user fails to so indicate for a particular search result image, or a particular application-selected face within a particular search result image, the user may be implicitly providing negative feedback about the application-selected face within the particular search result image.

In some implementations, a user may explicitly provide feedback regarding the search result images by selecting a checkbox or radio button to indicate that a search result image includes or does not include a match for the query face. In another example, a user may explicitly provide negative feedback by inputting a name other than a name provided for a face within a search result image in a textbox associated with the face, or by selecting an alternative name from a drop-down menu, to indicate that a search result image includes or does not include a match for the query face, or, in a sorting implementation, by moving a sorted search result image to a different folder, thus indicating that the search result image includes a face that does not match other faces in the folder into which the search result image was sorted. Furthermore, if a search result image includes more than one face, the user may similarly indicate whether the application-selected face within the search result image is or is not a match for the query face, and whether any other faces, other than the application-selected face, within the search result image are a match for the query face.

The positive and negative feedback explicitly or implicitly provided by the user to client 110 may be used by host 130 to infer additional feedback. For example, a user may interact in a positive way with a search result image that includes more than one face. In particular, the user may interact positively with the application-selected face, such that the host 130 may receive feedback that the application-selected face is, in fact, a match. Based on the received feedback, e.g., the user provides positive feedback for the application-selected face and does not provide feedback for the other faces within the search result image, host 130 may infer that the other faces in the search result image (i.e., faces other than the application-selected face) are not a match for the query face. Similarly, if the received user feedback indicates that the application-selection face is not a match, and the user does not provide feedback for the other faces within the search result image, host 130 may infer that none of the faces within the search result image are matches for the query face. Alternatively, if the received user feedback indicates that the application-selected face is not a match, but another face within the search result image is a match, host 130 may infer that any faces within the search result image, other than the user-selected face, are not matches. For example, although a user may reject the application-selected face as a match, the user may indicate that another face in the image (referred to as a user-selected face) is a match for the query face by, for example, cropping the image to include only the non-application-selected face or by explicitly interacting with the face with a pointing device (such as, for example, a mouse or stylus). In this case, host 130 may infer that the other faces in the image (including the application-selected face) are not matches.

Thus, host 130 may use both the received explicit and implicit user feedback and the inferred additional feedback to update the search result images. Host 130 may use information related to the user-selected face, such as, for example, a feature vector formed for the user-selected face, and information related to the non-matching faces, such as for example, feature vectors formed for the application-selected face or for faces other than the application-selected face and the user-selected face within the search result image, to re-examine the search faces and provide improved matches to the query face based on the new information. In a sorting implementation, images may be re-sorted based on the explicit and implicit user feedback and the inferred additional feedback.

Figure 3:
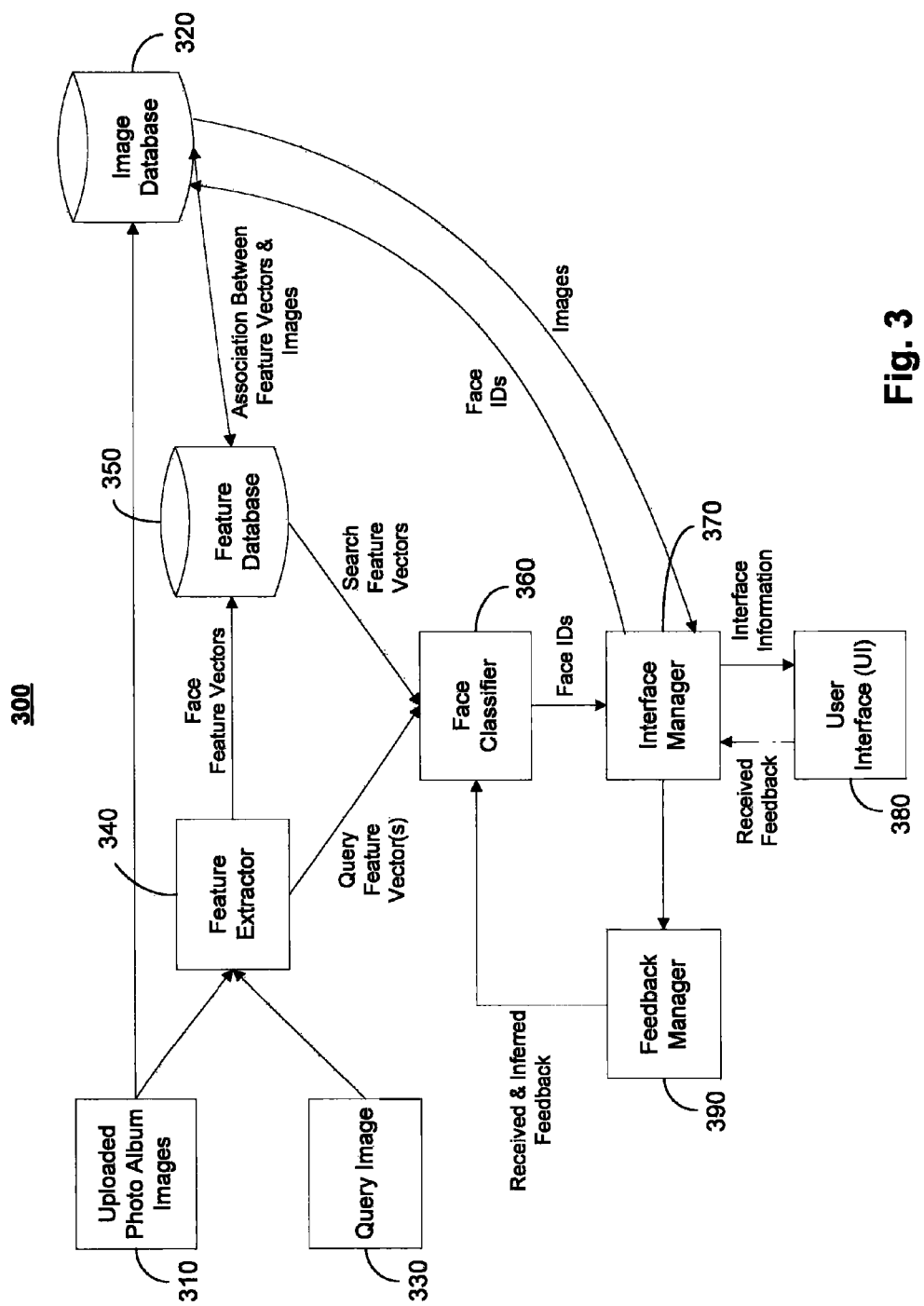
FIG. 3 is a block diagram showing an example of a face-recognition system.

FIG. 3 is a block diagram showing an example of a face-recognition system 300. System 300 may include components implemented by host 130 or client 110 to carry out implementations of process 200. In the implementation shown, each of the components of system 300 is implemented on host 130, with the exception of user interface 380. However, in other implementations, the functionality may be distributed differently among host 130 and client 110. For example, all components may reside on client 110 and all processes may be performed by client 110 rather than host 130. In still other implementations, different components may be used to define the structure of the system 300.

System 300 includes uploaded photo album images 310. The photo album images may include photographs, or images, that were uploaded by a user to an online photo album, such as, for example, an AOL Pictures® photo album provided by the America Online® (AOL®) online service provider. The uploaded images may be stored in image database 320. A query image 330 may be accessed. Query image 330 can be used by system 300 as a basis for searching image database 320 for images that include a face that is the same as a query face within query image 330. Multiple images that include a query face that belongs to the same person may be accessed. If, in a searching implementation, a user seeks images that include at least one of two different faces, where the faces belong to two different people, a query image that includes two different query faces may be accessed or two query images, each of which includes a different query face may be accessed.

Alternatively, prior to accessing a query face, the system 300 may cluster images into groups, or folders, of images that include faces that are determined to be close to one another. For example, the system 300 may group images that include faces that are within a particular distance, or distortion, from one another, and then present each group to the user. The user then may label some or all of the groups with, for example, the name of the person whose face is included in the images within the group. The user also may indicate which, if any, images have been incorrectly categorized and the user further may indicate a correct categorization, or group, for the misplaced images.

In another implementation, a user may upload additional images or may access additional images that have already been uploaded in the same, or a different, album that contain faces that have not been sorted and/or labeled. The unsorted and/or unlabeled faces then may be compared to the already sorted or labeled faces (i.e., query faces) to determine which ones of the unlabeled images contain the same face as a particular labeled (or query) face. Once it has been determined which ones of the unlabeled images contains a face that is the same as a labeled (or query) face, the unlabeled face may automatically be labeled with the same label associated with the query face. For example, the system 300 may cluster images into two groups. A user may label the groups as a face A group and a face B group. The user then may upload additional images that include faces. The faces within the additional images may be determined to be the same as the faces in the face A group. Thus, the faces within the additional images also may be added to the face A group and given a face A label.

Faces in uploaded photo album images 310 and the query face in query image 330 are sent to feature extractor 340. Feature extractor 340 detects features related to the faces and uses the extracted features to form a feature vector for each face, as described in detail below.

A feature vector may be used to represent a face and includes a series of values, where each value represents information about a particular feature of the face. The features may relate to shapes (referred to as geometry) or appearance (referred to as photometry) of individual facial features, or the entire face, such as, for example, eye color, nose width, distance between the eyes and skin tone. For example, features may have values derived from one or more pixel intensities associated with a particular location on a face. The features also may include non-face based features, such as clothing patterns and colors, background shapes and body proportions.

Feature vectors formed for faces in uploaded photo album images 310 may be referred to as face feature vectors. The face feature vectors may be stored in feature vector database 350. An association may be made between uploaded photo album images 310 that have been stored in image database 320 and the feature vectors formed for faces within the uploaded photo album images 310 and stored in feature vector database 350. Because an image may include more than one face, the image may be associated with more than one feature vector. In addition, location information for each face in an image, such as, for example, that a particular face is located at particular pixel locations within the image, may be associated with the feature vector for each face. The association may enable presentation, when needed, of one of the uploaded photo album images 310 that includes a face having a particular feature vector. For example, a face within a particular uploaded photo album image may be determined to be the same as a query face based on the feature vector formed for the face. An association between the feature vector for the face and the image in which the face is included may enable presentation of the particular image as a search result image.

Upon receiving query image 330, system 300 may initiate a search of the images stored in image database 320 for images that include a face that is the same as the query face within query image 330. The search may involve comparing the feature vector formed for the query face by feature extractor 340, generally referred to as a positive query feature vector, with search feature vectors. At this point, the face feature vectors may be referred to as search feature vectors because the feature vectors now represent search faces in search images that may be searched for a match to the query face. As such, the positive query feature vector and the search feature vectors may be provided to face classifier 360.

In addition to referring to a feature vector formed for a query face, a query feature vector also may refer to a feature vector formed for a face, other than a query face, that aids in the determination of whether an image includes a particular face. For example, a user may provide a particular query face and, in response to receiving search result images for the particular query face, provide positive feedback related to an application-selected face in a search result image to indicate that the application-selected face is, in fact, a match for the particular query face. In one implementation, a feature vector formed for the application-selected face may be used to help locate faces that are the same as the particular query face in later searches for the particular query face. In this implementation, the feature vector formed for the application-selected face also may be referred to as a positive query feature vector because it aids in determining search result images that include faces that are the same as a query face.

Furthermore, a user may provide additional information when selecting a query face. For example, if the user selects only one face in a query image as the query face (or positive query face), it may be inferred that all other faces within the query image (negative query faces) do not belong to the person associated with the query face. Thus, the feature vectors associated with the negative query faces may be referred to as negative query feature vectors because the determination that the negative query faces are not a match for the query face may aid in determining search result images that include faces that are the same as the positive query face.

Face classifier 360 may compare the search feature vectors with the positive, and possibly negative, query feature vectors until an appropriate match to a positive query feature vector is detected. When a particular search feature vector is determined to match a positive query feature vector, an indication of the search face, and search image, with which the feature vector is associated may be determined. The indication may include an identifier, or face ID, for the face represented by the matching search feature vector.

The face ID may be provided to interface manager 370. Interface manager 370 may further provide the face ID to image database 320. In response, image database 320 may provide to the interface manager 370 the image that includes the face represented by the face ID, now referred to as a search result image. The interface manager then may provide interface information to user interface 380. The interface information may include the search result image or an identification of the search result image.

UI 380 may be configured to display the search result image to a user who initiated a search for images or a sorting of images. UI 380 also may be configured to receive explicit and implicit user feedback regarding the search result image from the user and may provide the explicit and implicit user feedback to interface manager 370. In response, interface manager 370 may provide the explicit and implicit user feedback received from UI 380 to feedback manager 390. Feedback manager 390 may provide the received explicit and implicit user feedback to face classifier 360. In addition, feedback manager 390 also may infer additional feedback based on the received explicit and implicit user feedback. In this configuration, feedback manager 390 may provide the inferred additional feedback to face classifier 360 along with the explicit and implicit feedback received from the user via UI 380.

Face classifier 360 may use the received explicit and implicit user feedback and the inferred additional feedback to re-search, or re-sort, the search feature vectors for additional and more accurate matches to the query feature vector. Images that include faces represented by the additional and more accurate matching search feature vectors may be provided to the user as search result images in the manner described above.

Figure 4:
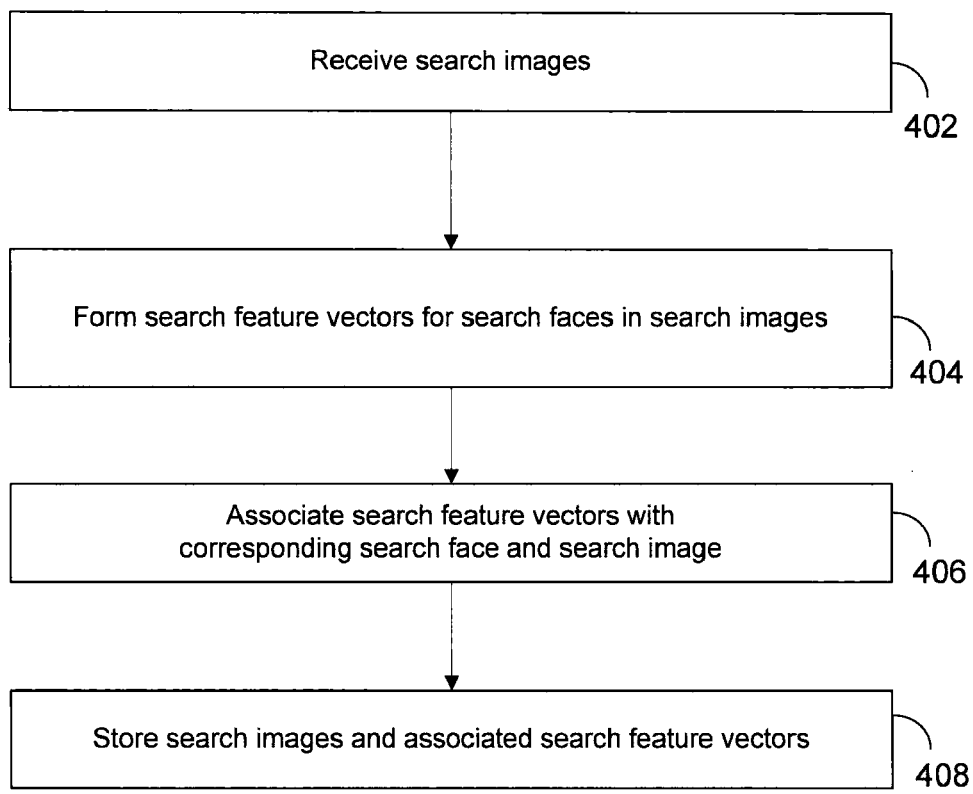
FIGS. 4-11 are flow charts that represent particular implementations of operations performed by the process of FIG. 2.
Figure 5:
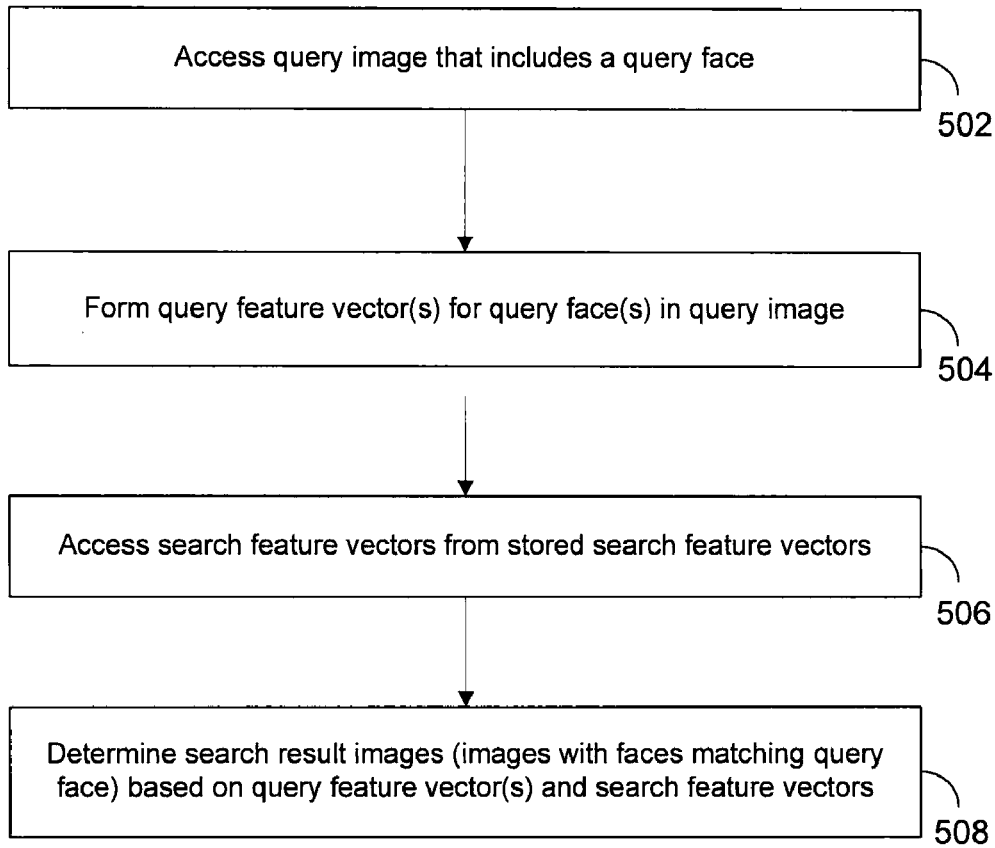
Figure 6:
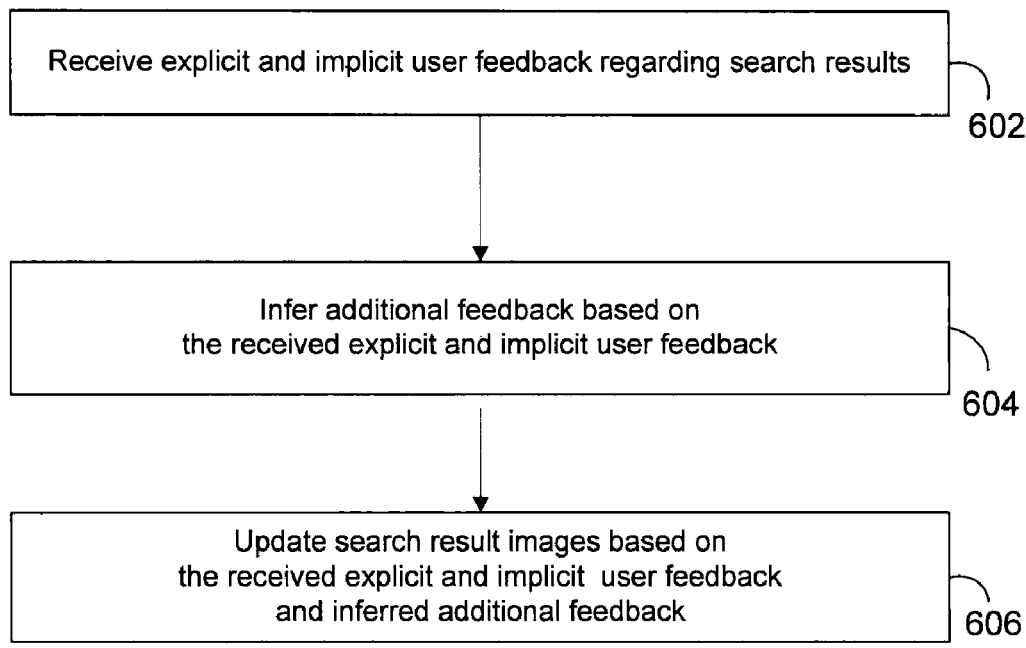

In general, FIGS. 4-6 illustrate particular examples of processes that may be used to implement aspects of the process 200. The following discussion describes one implementation in which the operations of the processes are performed by host 130 generally and system 300 in particular. However, other implementations may employ different components to carry out the operations of the processes. For example, all components of system 300 may reside on client 110 and all processes may be performed by client 110 generally rather than host 130.

More particularly, FIG. 4 is a flow chart that represents a particular implementation of operation 202 of FIG. 2 for receiving and storing search images that include search faces.

Host 130 receives search images (402). Search images may include unsorted and/or unlabeled images uploaded by a user to an online photo album, such as uploaded photo album images 310. The images used as search images need not be uploaded at the same time or to the same photo album or folder of a photo album. Furthermore, the images used as search images also may include images that reside on a user's physical hard drive, a virtual hard drive, or some other storage medium, such as a memory card or stick for a digital camera.

Feature extractor 340 forms search feature vectors for search faces in search images (404). Feature extractor 340, as described in detail below, detects faces in search images and forms a feature vector for each face in each of the search images. If it is determined that a particular search image does not include at least one face, the search image may be removed from consideration in the present search for images, as well as, in some implementations, being permanently removed from the set of search images. The faces in the search images may be referred to as search faces and the feature vectors formed for the search faces may be referred to as search feature vectors. Formation of feature vectors is described in more detail below.

Feature database 350 associates the search feature vectors with a corresponding search face and search image (406). Once a feature vector is formed for a particular search face within a particular search image, the search face and search image are associated with the search feature vector. This enables host 130 to provide a search image and indicate a particular search face within the search image in response to receiving an indication of a particular search feature vector. For example, if a particular search feature vector is determined to be a match for a query feature vector, the association between the particular search feature vector and a search face and a search image may enable host 130 to provide the search image, and an indication of the search face within the search image as an application-selected face, as a search result image.

Host 130 stores search images and associated search feature vectors in image database 320 (408). Once feature vectors are formed for search faces within search images and the feature vectors are appropriately associated with the corresponding search face and search image, the search images and the search feature vectors are stored by host 130 for use by a face-recognition algorithm or face classifier to find images that include faces that are the same as the query face.

FIG. 5 is a flow chart that represents a particular implementation of operation 206 of FIG. 2 for determining search result images that include a face that is the same as the query face.

Host 130 accesses a query image, such as query image 330, that includes a query face (502). The query face is a face to which matches are sought. The user may provide a query image by uploading the query image or selecting the query image from a collection of images in, for example, an online photo album. Furthermore, if the query image includes more than one face, the user may indicate which face is the query face. Additionally, or alternatively, already sorted faces that have been explicitly or implicitly confirmed by the user and/or labeled faces may be accessed as query faces for automatically sorting and labeling of images that include unknown or unlabeled faces.

Feature extractor 340 forms a positive query feature vector for a query face in the query image (504). If the query image includes more than one face, and only one of the faces within the query image is to be used as a query face, feature extractor 340 also may form negative query feature vectors for the other faces in the query image. Formation of query feature vectors is described in detail below.

If the query image includes more than one face, only one of the faces in the query image may be used as the query face. Alternatively, more than one face in the query image may be used as a query face. In this case, assuming the faces belong to different people, search result images may include at least one of the query faces, all of the query faces, or some sub-set of the query faces. For example, a query image may include three faces belonging to person A, person B and person C, respectively. The user may indicate that the face of person A and the face of person B may be used as query faces. In this example, it may be determined whether search result images should include just face A, just face B or both face A and face B. It may further be determined whether a search result image that includes face A and face B should include only face A and face B, or may include face A and face B with other faces. The system may return the search result images to the user in a manner that differentiates the different types of search result images to a user. For example, search result images that include face A, but not face B (with or without other faces) may be placed in a first folder, search result images that include face B, but not face A (with or without other faces) may be placed in a second folder, and search result images that include both face A and face B (with or without other faces) may be placed in a third folder.

Face classifier 360 accesses search feature vectors from stored search feature vectors (506), and determines search result images (e.g., images with faces matching the query face) based on the query feature vector(s) and the search feature vectors (508). As described in detail below, face classifier 360 may compare search feature vectors to the query feature vector, or query feature vectors if there is more than one (positive or negative) query face, to determine whether any of the search feature vectors represent faces that are the same as the positive query face. When matches are found, the search face represented by the matching search feature vector, and the search image in which the search face is included, may be determined. The search image may be returned as a search result image with the search face corresponding to the search feature vector being returned as an application-selected face within the search result image (as indicated by operation 208 of process 200).

FIG. 6 is a flow chart that represents a particular implementation of operation 210 of FIG. 2 for receiving user feedback, inferring additional feedback and using both the received user feedback and the inferred additional feedback to update search result images.

Host 130 receives explicit and implicit user feedback regarding search results (602). The user feedback may be received at client 110 via UI 380 and provided to interface manager 370 and feedback manager 390. The explicit and implicit user feedback received may be positive or negative user feedback. Positive user feedback may include an indication that a user finds an application-selected face to be the same face as a query face. Negative user feedback may include an indication that the user does not find the application-selected face to be the same as the query face. As described above, positive and negative user feedback may be obtained from the user's interaction, or lack of interaction, with a search result image and an application-selected face within the search result image.

Feedback manager 390 infers additional feedback based on the received explicit and implicit user feedback (604). For example, a user may interact positively with an application-selected face, in a search result image that includes more than one face, such that the host 130 may receive feedback that the application-selected face is, in fact, a match to the query face. Based on the positive received feedback in this case, feedback manager 390 may infer that other faces in the search result image (i.e., faces other than the application-selected face) are not a match for the query face. Similarly, if the received user feedback indicates that the application-selected face is not a match, and no other user feedback is received for the search result image, feedback manager 390 may infer that any additional faces in the search result image (i.e., faces other than the application-selected face) are not a match. Alternatively, if the received user feedback indicates that the application-selected face is not a match, but that another face within the search result image is a match, feedback manager 390 may infer that any additional faces in the image are not a match.

Host 130 updates the search result images based on the received explicit and implicit user feedback and the inferred additional feedback (606). Host 130 updates the search result images by forwarding the received explicit and implicit user feedback and the inferred additional feedback from feedback manager 390 to other components, such as face classifier 360. For example, the received explicit or implicit user feedback may indicate that an application-selected face is not a match for the positive query face, or that although the application-selected face is not a match for the positive query face, another face within a search result image is a match. Additional feedback may be inferred from the explicit or implicit positive user feedback, such that the rest of the faces within the image, including the application-selected face, are not matches. Face classifier 360 may use the feature vector formed for the user-selected face (as a positive feature vector, as described in detail below), and the rest of the faces in the image (as negative feature vectors, as described in detail below), to re-examine the search faces and provide additional matches for the positive query face that are more likely to be correct.

Figure 7:
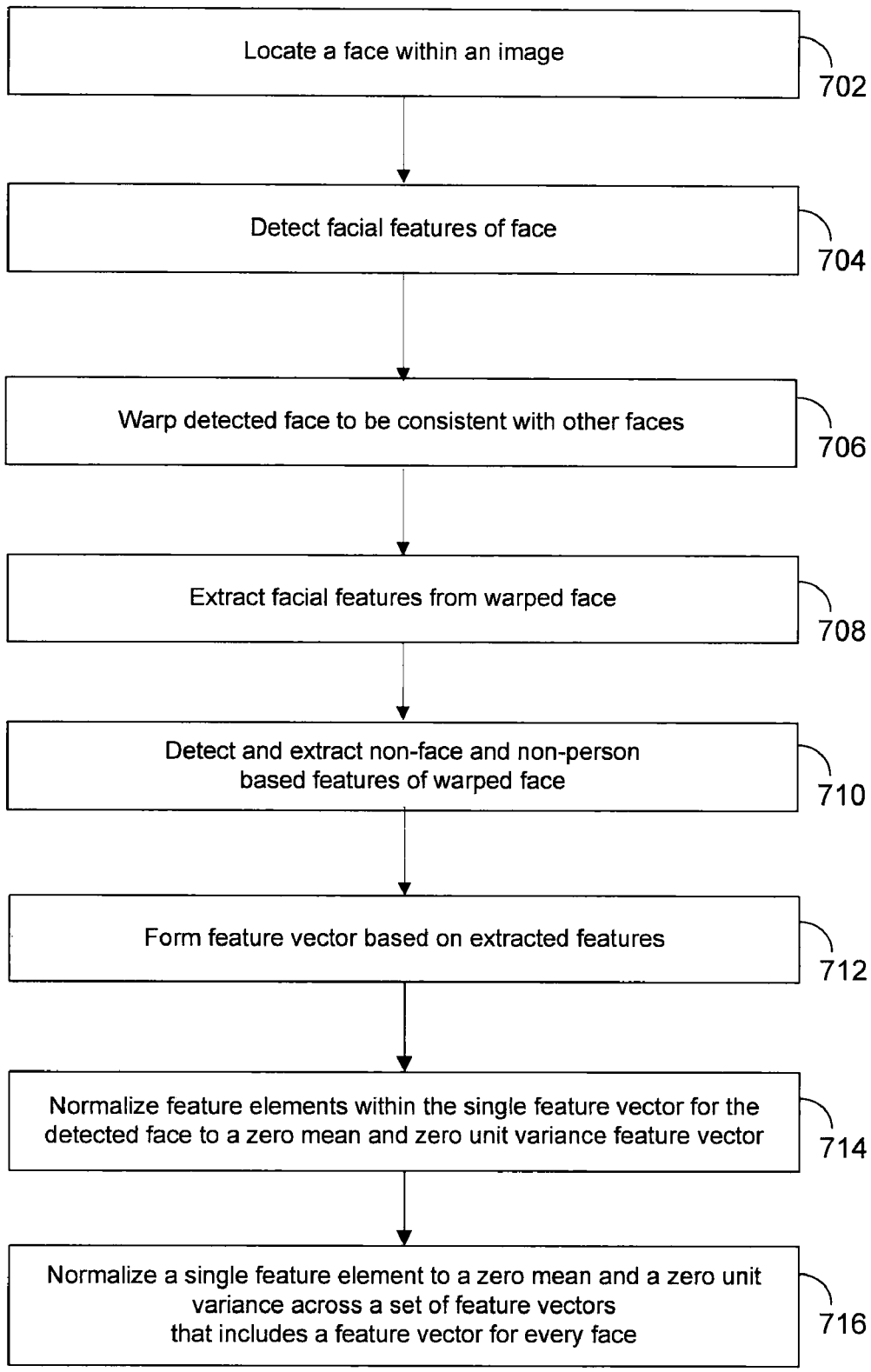

FIG. 7 is a flow chart that represents a process 700 that may be used to implement operation 404 or 504 of FIGS. 4 and 5, respectively. Process 700 may be performed by feature extractor 340.

Feature extractor 340 locates a face within an image (702). To do so, feature extractor 340 may use a technique, such as, for example, the Viola-Jones face detector as described in P. Viola and M. Jones, *Robust Real-Time Face Detection*, International Journal of Computer Vision, volume 57(2), pages 137-154, 2004, which is incorporated herein by reference in its entirety.

Upon detecting a face within an image, the face detector may provide, laid over the image, a bounding box around the detected face with an indication of a predicted face center. The face detector also may scale the face to a predefined size. For example, the detected face may be scaled to 100×100 pixels. The scaling may reduce scale variation between faces in different images, making it easier for feature extractor 340 to detect particular facial features within the face, and ultimately form a feature vector for the face.

Feature extractor 340 detects facial features of the face (704). More particularly, feature extractor 340 may detect a location of various pre-defined facial features within the detected, scaled face, as described in detail below.

In one implementation, feature extractor 340 may detect a location for 19 pre-defined facial features. The 19 pre-defined facial features may include (1) left side of left eyebrow (LLB), (2) right side of left eyebrow (RLB), (3) left side of left eye (LLE), (4) right side of left eye (RLE), (5) top of left eye (TLE), (6) bottom of left eye (BLE), (7) left side of right eyebrow (LRB), (8) right side of right eyebrow (RRB), (9) left side of right eye (LRE), (10) right side of right eye (RRE), (11) top of right eye (TRE), (12) bottom of right eye (BRE), (13) left side of nose (LN), (14) bottom of nose (BN), (15) right side of nose (RN), (16) left side of mouth (LM), (17) right side of mouth (RM), (18) top of mouth (TM) and (19) bottom of mouth (BM).

Feature extractor 340 may warp the detected face so that the detected face is consistent with other detected faces (706). To do so, feature extractor 340 may use a two-dimensional similarity transformation or dilation to scale (or stretch), rotate or translate the face. The transformation ensures that the face is positioned without a tilt to one side and the features within the face are scaled to be consistent with other detected faces. Scaling may be based on a comparison, across a meaningful number of faces and with respect to a constant, of an average distance of all features within a face to the center of the face. For example, if the average distance between all 19 feature locations within a particular face to the center of that face is 10 pixels, but the average distance (over a meaningful number of faces) is 14 pixels, the particular face may be scaled up to increase the distance from 10 pixels to 14 pixels Rotation may be based on the left side of left eye (LLE) and right side of right eye (RRE) points. For example, if a particular face in an image is tilted towards the right shoulder, such that the left side of left eye may be at a 45° angle from a horizontal plane, and the right side of right eye may be at a 0° angle from the horizontal plane (i.e., lies on the horizontal plane), the particular face may be rotated so that the left side of left eye and the right side of right eye are parallel. Rather than literally rotating the face to square the features, an amount of rotation of a particular face may be determined and taken into account to locate the features of the particular face at their present, un-rotated, locations. More particularly, the (x,y) coordinate of the LLE location may be denoted as $(x_l, y_l)$, the (x,y) coordinate of the RRE location may be denoted as $(x_r, y_r)$ and $x\_diff=(x_r-x_l)$ and $y\_diff=(y_r-y_l)$. The following formula, which incorporates scaling and rotation, may be used to determine locations of features within (and thus where to extract features from) the face, i.e., given pixel locations (x,y), pixels may be extracted from the face at locations determined by the following formula:

$$s \begin{bmatrix} \cos(th) & \sin(th) \\ -\sin(th) & \cos(th) \end{bmatrix} \begin{bmatrix} x \\ y \end{bmatrix}$$

where th=−a tan(y_diff/x_diff), s is the scaling value, as determined by the description above, and x and y are the locations of the features and the surrounding regions.

Feature extractor 340 extracts facial features from the warped face (708). To do so, feature extractor 340 may extract N×N square patches from the warped face at the previously detected locations of the pre-defined facial features. In some implementations, the square patches are 11×11 pixels in size.

In an implementation where 19 pre-defined facial features are located, feature extractor 340 may extract the N×N square patches at the 19 locations within the warped face. Feature elements may then be obtained from the 19 N×N square patches. A feature element may represent an intensity value of a particular pixel in the N×N patches. Thus, a particular number of feature elements (e.g., 19×N×N) may be extracted from a particular face when 19 facial features are located and an N×N square patch is extracted from each of the 19 facial feature locations, where a feature element is represented by the intensity value of a particular pixel. In the implementation where N=11, such that the square patches are 11×11 in size, the number of feature elements extracted may be 2,299 (i.e., 19×11×11).

Feature extractor 340 detects and extracts non-face based and non-person based features of the warped face (710). In addition to various facial features, a face within an image may have non-face based features associated with the face. For example, hair texture, color and length, ear shape, neck coloring, collar, or other clothing features each may be a non-face based feature that is associated with a particular face. Further in addition to various facial features, an image may include non-person based features. In one example, an image may include information related to the day or time the photograph was taken, either in the form of a tag associated with the image or in the form of a day/time stamp imprinted in the image. More particularly, a face within an image may have, for example, the 19 facial features, as well as brown, shoulder-length hair with bangs, attached earlobes, dark skin pigmentation on the neck, and a purple shirt, as well as a date stamp indicating the image was taken on Mar. 3, 2006.

In some implementations, feature extractor 340 may detect these non-face based features and extract feature elements from the non-face based features in a manner similar to that described above with respect to detection and extraction of facial features.

Feature extractor 340 forms a feature vector based on the extracted features (712). A feature vector may be a numerical representation of a face within an image and may include a set of values. The values may correspond to the feature elements determined from the extracted facial features. In an implementation where 19 pre-defined facial features are located and N×N square patches are extracted at the 19 locations, there may be 19×N×N feature elements for a particular face within an image. Thus, a feature vector formed for the particular face may include 19×N×N values—one value for each feature element.

In implementations where non-face based and non-person based features are detected and extracted, feature elements of the non-face based and non-person based features also may be included in the feature vector formed for a face within an image.

Once the feature elements are extracted from a face, and a feature vector formed for the detected face, the feature elements within the single feature vector associated with the detected face may be normalized to a zero mean and zero unit variance feature vector (714). Normalization may be performed by determining a mean $m_k$ and a variance $v_k$, for the feature vector $F_k$, and modifying the feature vector according to the following formula.

$$F_k = \left\{ \frac{(F_{k1} - m_k)}{v_k}, \ldots, \frac{(F_{kp} - m_k)}{v_k} \right\}$$

where $F_k$ is a feature vector for a particular face such that $F_k=\{F_{k1}, \ldots, F_{kp}\}$, where p=19×N×N, and where k=1, . . . , q for a set of q feature vectors.

Once the feature elements are extracted from a meaningful number of faces, and feature vectors formed and normalized for the meaningful number of faces, each of the normalized feature vectors may be subjected to an additional normalization. As such, a single feature element may be normalized to a zero mean and a zero unit variance across a set of feature vectors that includes a feature vector for every face (716). For example, a first feature element (out of the possible 19×N×N feature elements) may be normalized across a set of feature vectors where the set includes a feature vector for each face. More particularly, for a set of feature vectors $F_1, \ldots, F_q$, where $F_1$ is the feature vector (including p feature elements) for a first face (i.e., $F_1=\{F_{11}, F_{12}, \ldots F_{1p}\}$), and there are q faces, normalization for each element i may be performed by determining a mean $m_i$ and a variance $v_i$ across a set of feature elements $F_{ki}$, where k=1, ..., q, and modifying the feature vector $F_1$ for each element i according to the following formula.

$$F_{ki} = \frac{F_{ki} - m_i}{v_i}$$

for i=1, ..., p and k=1, ..., q.

For consistency, the normalization of a feature element across a single feature vector and the normalization of a single feature element across multiple feature vectors should be performed for all feature vectors, regardless of whether the feature vector may be used as a query feature vector or a search feature vector. Furthermore, in some implementations, the normalization across the set of feature vectors may be repeated when new feature vectors are created such as, for example, when new images are added to the photo album. In other implementations, when new feature vectors are created, the new feature vectors may be normalized using the mean and variance calculated during the initial normalization across the set of feature vectors that did not include the newly created feature vectors. Alternatively, in some implementations, only one of the two types of normalization may be performed, or no normalization may be performed.

Figure 8:
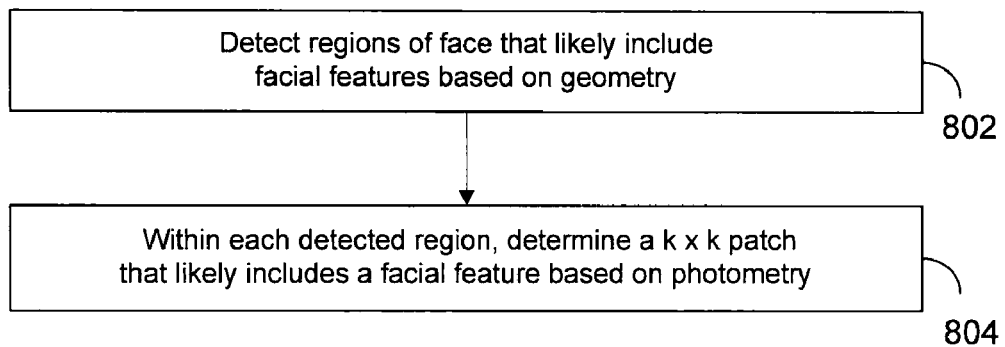

FIG. 8 is a flow chart that represents a particular implementation of operation 704 of FIG. 7 for detecting facial features of a face. Process 704 also may be performed by feature extractor 340.

For a given facial feature, feature extractor 340 locates regions of a face that likely include the facial feature based on geometry and photometry (802 and 804, respectively). As described above, in some implementations, faces may be determined to include 19 pre-defined facial features.

Feature extractor 340 may locate the facial features using a set of pre-trained probability models, as described in detail below. A model may be trained to determine higher probabilities for regions of a face, or particular locations within a face, that likely include facial features based on geometry of a face (802). More particularly, the model may determine higher probabilities for locations that likely contain particular facial features based on a distance from the center of a face (which information may be provided upon recognition of the face, as discussed above). For example, the model may determine higher probabilities for locations within a particular region of a face that likely includes the location of left side of left eye (LLE) because the region is within an acceptable range of distances between the center of the face and a typical location for left side of left eye (LLE). The model may provide information about the probability of facial features located at particular locations in this way because each face may have been warped and scaled by feature extractor 340 to an average, or pre-selected, set of dimensions.

At each particular pixel location within a reasonable region that has been detected for a feature (where the likely region location and size may be determined through training of the model), feature extractor 340 determines a k×k patch of pixels (where the k×k patch may be of larger, smaller or equal dimensionality to the N×N patches described previously) that includes a facial feature based on photometry (804). Photometry refers to appearance and may be used to describe, for example, skin tone as determined by pixel intensity. Alternatively, the distribution of pixel intensities across a k×k patch of pixels may provide information about the shape of a particular feature, such as, for example, an eye or a side of a mouth. More particularly, within each reasonable region, k×k patches of pixels may be evaluated in a sliding window configuration to determine which patch contains the facial feature or which patch is centered on a particular facial feature location. The patches may be evaluated based on the probability model trained to determine a confidence level that a patch contains a feature or that a patch is centered on a particular facial feature location.

In general, a probability model may be trained based on information on the locations of the facial features as determined by human training users. A different probability model also may be trained based on information extracted from pixels around the locations of the facial features that have been identified by human training users. To train such a model, a training user may indicate an exact location of a facial feature. As such, patches that include a facial feature and patches that do not include a facial feature may be determined and stored as training data. The training data provided by the training users may be used to determine a probability that an untested patch includes a particular facial feature, as described in detail below.

In one implementation, the training data may be used to determine a probabilistic distribution that may be used to determine a confidence level that an untested k×k patch includes a particular facial feature, such as, for example, an eye. The confidence level may be determined and assigned to a patch using a log-likelihood ratio. The log-likelihood ratio (llr) may be determined using the following formula.

$$llr(x) = \log p(x|e) - \log p(x|\bar{e})$$

where $p(x|e)$ is the probability that a patch x includes a facial feature and $p(x|\bar{e})$ is the probability that a patch x does not include the facial feature.

For each class c (i.e., patch includes facial feature and patch does not include facial feature), the probability that a patch does or does not include a facial feature (depending on the class) may be modeled as a Gaussian distribution, as follows:

$$p(x|c) = \frac{1}{(2\pi)^{d/2}|\Sigma|^{1/2}} \exp\left(-\frac{1}{2}(x-\mu)^T \Sigma^{-1} (x-\mu)\right)$$

where $\mu$ is the mean, $\Sigma$ is the covariance and d=k×k, i.e., the dimensionality of the patch. The maximum likelihood estimates of the mean and covariance for each class may be determined based on the training data using the following formulas.

$$\tilde{\mu} = \frac{1}{N}\sum_{i=1}^{N} x_i$$

$$\tilde{\Sigma} = \frac{1}{N-1}\sum_{i=1}^{N} (x_i - \tilde{\mu})(x_i - \tilde{\mu})^T$$

where x is a patch and N is the total number of patches in the training data.

In some implementations, the covariance may be regularized by adding a scaled identity matrix to the determined covariance, such that $\Sigma = \tilde{\Sigma} + \lambda I$, where $\lambda$ is a constant and I is the identity matrix.

The patch with the highest log-likelihood ratio may be selected as the patch within the detected region that includes the facial feature.

In another implementation, training data may be used to determine a geometry Gaussian model, such as the model described above. More particularly, the geometry Gaussian model may be determined based on distances between points selected for a feature by the human training users (i.e., the training data) and the center of the Viola-Jones detected face. The geometry Gaussian model may be used to determine geometrical probabilities for locations within a face that are good candidates to include a particular facial feature.

In addition, patches for each facial feature, such as k×k patches, may be extracted at various locations (as determined by the training data). During training, principal component analysis (PCA) then may be applied to the patches to determine a set of eigenvectors or principal components for each patch. Principal component analysis refers to a linear transformation that creates a new coordinate system for the training feature vectors such that the greatest variance by any projection of the data is captured on the first principal component, or axis, the second greatest variance is captured on the second principal component, or axis, and so on. By retaining just a small number of the lower-order principal components, where the number of principal components retained is smaller than the original dimensions of the feature vector, PCA can be used for reducing the dimensionality of the feature vectors used to represent the data while maintaining the most important information contained within the original data. A photometry Gaussian model then may be determined based on the patches created after application of PCA, i.e., after projection of the patch onto the new space defined by the principal components, dimensions, or eigenvectors. The photometry Gaussian model may be used to determine photometrical probabilities for locations within a face that are good candidates to include a particular facial feature.

Locations of facial features within new faces (i.e., faces that were not shown to the training users) then may be determined. For each new face, a normalized feature vector (e.g., a feature vector that has been normalized to zero mean and unit variance) may be determined. The normalized feature vector then may be projected on to the space defined by the new dimensions determined through PCA. The geometry Gaussian model and the photometry Gaussian model may be used to determine two different probabilities for candidate locations of a particular facial feature within the new face. The two probabilities then may be multiplied together, and the highest probability location may be determined to be the location that most likely includes the facial feature.

Figure 9A:
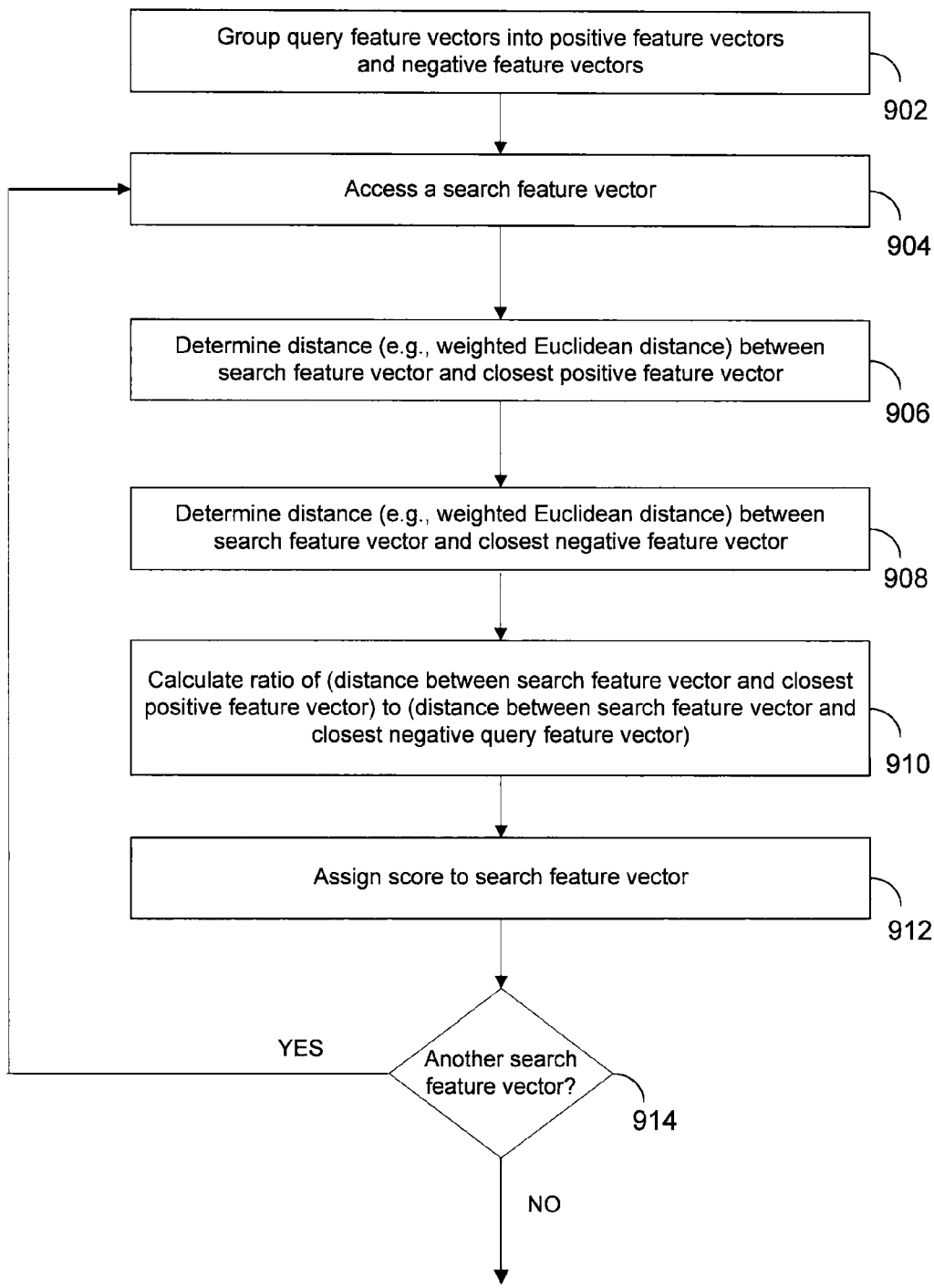
Figure 9B:
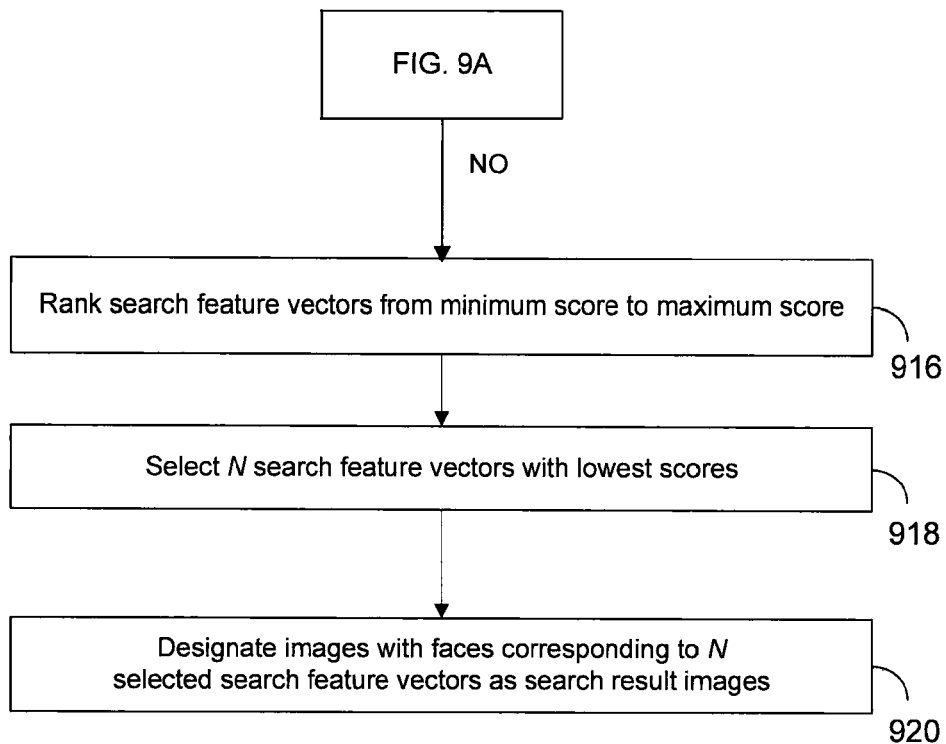

FIGS. 9A and 9B are a flow chart that represents a particular implementation of operation 508 of FIG. 5 for determining search result images based on query feature vectors and search feature vectors. Process 508 also may be performed by face classifier 360.

Face classifier 360 groups query feature vectors into positive feature vectors and negative feature vectors (902). For example, a query image may include more than one face. One of the faces within the query image may be designated explicitly or implicitly by a user as a positive query face (i.e., the face to which matches in other images should be found). The other faces may thus be designated as negative query faces. A feature vector formed for the positive query face may be referred to as a positive feature vector, while feature vectors formed for the faces in the query image that are not selected as a positive query face may be referred to as negative feature vectors. If more than one query face is selected in a query image as belonging to a single individual, more than one feature vector may be considered a positive query feature vector. Similarly, if a query face belonging to a single individual is selected in more than one query image, more than one feature vector may be considered a positive query feature vector. Alternatively, if more than one query face is selected, but the more than one query faces each belong to a different person, then in the search for a match to a query face belonging to one person, all other query faces that have been designated as belonging to different people may be considered as negative query feature vectors.

In another example, in response to being presented with search result images, a user may provide positive feedback related to a particular application-selected face (i.e., the application-selected face is a match for the query face). The positive feedback may indicate that the feature vector formed for the application-selected face provides positive information that is useful for the determination of search result images for the query face. Similarly, if a user provides negative feedback related to a particular application-selected face (i.e., the application-selected face is not a match for the query face), the feature vector formed for the application-selected face provides negative information that is useful for the determination of search result images for the query face. In yet another example, any inferred additional feedback that, for example, indicates that a particular face is not a match for the query face, may cause the feature vector formed for the particular face to be determined as negative information that is useful for the determination of search result images for the query face.

Upon determining feature vectors that are positive and negative, face classifier 360 may group positive query feature vectors and negative query feature vectors by adding positive feature vectors to a collection of positive feature vectors and adding negative feature vectors to a collection of negative feature vectors.

Prior to receipt of explicit and implicit user feedback, and additional feedback being inferred, there may only be a single positive query feature vector available to be placed in the collection of positive feature vectors. For example, if a query image that includes only one face is designated as the query image, only a single positive feature vector may be determined and added to the collection of positive feature vectors. In this case, the collection of negative feature vectors may remain empty. In another example, one of two faces within a query image may be selected as a query face. As such, the feature vector formed for the query face may be added to the collection of positive feature vectors and the feature vector for the other face within the query image may be determined to not belong to the person associated with the first face, and thus, may be added to the collection of negative feature vectors. In this case, both the positive and negative collections of feature vectors include one feature vector.

Face classifier 360 accesses a search feature vector (904) and determines a distance between the search feature vector and the closest positive feature vector (906). The closest positive feature vector may be determined, for example, by calculating a distance between the search feature vector and the positive feature vectors (e.g., the feature vectors in the collection of positive feature vectors). The positive feature vector having the shortest distance from the search feature vector may be used as the closest positive feature vector. If only one feature vector is present in the collection of positive feature vectors (e.g., the feature vector formed for the query face), face classifier 360 may determine a distance between the search feature vector and the single positive feature vector. Alternatively, a centroid for the positive feature vectors or a reduced set of positive features vectors may be determined and face classifier 360 then may determine a distance between the search feature vector and the centroid or reduced set of positive feature vectors.

A distance determined between two feature vectors may be a weighted Euclidean distance. The Euclidean distance between two feature vectors may represent an amount of similarity between two faces. A search face may be determined to be the same as a query face when their respective feature vectors are within a pre-selected distance of one another. In other words, the closer or smaller the distance between two feature vectors, the more likely it is that the two feature vectors represent the same face.

The Euclidean distance between two feature vectors may be calculated using the following formula.

$$D = \sqrt{(A_1-B_1)^2 + (A_2-B_2)^2 + \ldots + (A_n-B_n)^2}$$

where the two feature vectors are an A feature vector and a B feature vector each having n feature elements, such that the feature elements of each feature vector may be designated with the vector name (e.g., A) and a subscript indicating which feature element number is being referenced (e.g., $A_1$ refers to the first feature element in feature vector A).

A Euclidean distance may be weighted to emphasize particular feature elements. Feature elements that are good discriminators of whether two faces are the same may be positively weighted, while bad discriminators may be negatively weighted. If a certain feature, such as, for example, the distance between the eyes or the set of pixels that represent the mouth, is found to be particularly helpful in determining whether two faces are the same, the distance between the corresponding feature element in the query feature vector and a search feature vector may be weighted more than other feature elements when determining the distance between the search feature vector and the query feature vector. Weighting a particular feature element may cause two faces having similar values for the particular feature element to be determined to be the same face even if no other, or very few other, feature elements have values that are close. Weighting the particular feature element also may cause a first face to be determined to be the same as a second face when the first and second faces have close values for just the particular feature element, while the first face may be determined to not be the same as a third face even though the number of feature elements that are similar (e.g., have close feature element values) among the first and third faces may be more, but the feature elements that are similar are not as important (e.g., not weighted or not weighted as much) as the particular feature element.

To determine feature element weights, the face classifier 360, may, for example calculate a standard deviation for each feature element value i ($\sigma_i$, where i=1, 2, ... n) across the collection of positive feature vectors. The weights for each feature element value i ($w_i$) then may be assigned the inverse of the standard deviation, such that $w_i = 1/\sigma_i$. Doing so adds a higher weight to those feature elements that are more closely clustered around a particular value, which indicates the feature may be a good discriminator of sameness, especially if feature elements of negative feature vectors are located far from the cluster.

In the case where faces corresponding to more than one person have been designated as query faces, information about the differences across faces corresponding to different people and information about the differences among faces corresponding to the same person, both may be useful in determining search result images that include faces that match one, or more, query faces. To use this information, the weights for each feature element value j ($w_j$) may be assigned a value that represents the power of the feature to discriminate between faces, which may be referred to as the discriminatory power of the feature element. More particularly, if faces corresponding to M different people have been designated as query faces, M classes may exist. For each of the M classes, where each class includes $l_c$ feature elements, where c=0, ..., M-1, and L is the total number of feature elements across all classes, such that $$L = \sum_{c=0}^{M-1} l_c$$

a weight $w_j$, which corresponds to the discriminatory power of the element j, may be determined and set as the weight $w_j$, according to the following formula.

$$w_j = \sqrt{\frac{\sigma_j^2}{\tau_j^2}}$$

where $\sigma_j^2$ is the between-class variance and $\tau_j^2$ the within-class variance. The between-class variance $\sigma_j^2$ and the within-class variance $\tau_j^2$ can be determined based on the variance about the mean for element j, which may be determined by $$\frac{1}{L} \sum_{c=0}^{M-1} \sum_{i=0}^{l_c} [(x_j)_{i,c} - \overline{x_j}]^2$$

where the average of feature element j within class c is represented by $$(\overline{x_j})_c = \frac{1}{l_c} \sum_{i=1}^{l_c} (x_j)_{i,c}$$

and the average of feature element j across all L feature elements is represented by $$(\overline{x_j}) = \sum_{c=0}^{M-1} \frac{l_c}{L} (x_j)_{i,c}.$$

The variance about the mean then may be decomposed into the between-class variance $\sigma_j^2$ and the $\tau_j^2$ within-class variance where $$\sigma_j^2 = \frac{1}{L} \sum_{c=0}^{M-1} l_c [(\overline{x_j})_{i,c} - \overline{x_j}]^2 \text{ and } \tau_j^2 = \frac{1}{L} \sum_{c=0}^{M-1} \sum_{i=1}^{l_c} [(x_j)_{i,c} - (\overline{x_j})_{i,c}]^2$$

Upon determining the weights, the distance D between a feature element value in an untested feature vector (i.e., a search feature vector) and the corresponding feature element value within the query feature vector may be multiplied by its associated weight. Thus, $$D = \sqrt{\sum_{i=1}^n w_i (A_i - B_i)^2}$$

where $A_i$, i=1, 2, ... n, corresponds to the feature elements of the untested feature vector and $B_i$, i=1, 2, ... n, corresponds to the feature elements of the query feature vector.

In some implementations, rather than weighting feature elements and calculating the distance between all (weighted) feature elements in two feature vectors, a distance calculation may incorporate less than all feature elements. For example, only feature elements that are good discriminators (i.e., feature elements that would be weighted) may be incorporated into the distance calculation. In other words, instead of calculating a distance between each and every feature element in two feature vectors, the distance between only those feature elements that are good discriminators of sameness may be calculated and included in the value used to characterize the distance between the two feature vectors.

In some implementations, a different distance D may be determined for different subsets of feature elements for each class of faces. A subset of all the feature elements for a particular feature vector may include the N×N feature elements corresponding to the left side of the left eye (LLE). For example, generally, the LLE may be a good discriminator of sameness for a particular person. However, in one example of the person's face within an image, the person may be wearing sunglasses. In this case, the distance between the feature elements associated with the LLE in the feature vector for the sunglasses face and the feature elements associated with the LLE in all other feature vectors that correspond to the person, may be very large and thus the feature elements associated with the LLE may not be a good discriminator of sameness in this particular case. As such, it may be desirable to discard the distances related to the feature elements associated with the LLE in this case, and put more emphasis on other feature elements associated with other features (e.g., those associated with the nose and mouth, such as, for example, RM, LM, TM, BM, RN, LN, BN) that may aid in determining whether the sunglasses face is a match for a query face, so that a false negative is not determined. To deal with this problem, only a subset of feature elements may be used in determining the distance D. The feature elements that may be included in the subset in any particular case may be determined by calculating the distance, or distortion, between each set of N×N feature elements in the feature vector for the unknown face and the corresponding feature elements in the search feature vectors to which the unknown face is being compared. The sets of N×N feature elements having the smallest distances may be selected for the subset of feature elements. In one example, the 10 sets of N×N feature elements having the smallest distances may be selected to be included in the subset. Then, a total distance for a particular search feature vector may be calculated by combining the distances for only those sets of N×N feature elements included in the subset of feature elements.

In the event there are negative feature vectors, face classifier 360 also determines a distance between the search feature vector and the closest negative feature vector (908). Again, the distance may be a weighted Euclidean distance. Furthermore, the closest negative feature vector also may be determined by calculating the distance between the search feature vector and the negative feature vectors (e.g., the query feature vectors in the collection of negative feature vectors). Alternatively, a centroid for the negative feature vectors or a reduced set of negative feature vectors may be determined and face classifier 360 then may determine a distance between the search feature vector and the centroid or reduced set of negative feature vectors.

There may be instances where no negative feature vectors have been determined and, thus, the collection of negative feature vectors may be empty. For example, in a query image having a single face designated as the query face, only a positive feature vector may be determined. In this case, face classifier 360 may not determine a distance between the search feature vector and the closest negative feature vector.

There may be instances where only one negative feature vector is in the collection of negative feature vectors. For example, the feature vector formed for a face in the query image that was not designated as the query face may be the only negative feature vector. In this case, face classifier 360 may determine a distance between the search feature vector and the single negative feature vector.

In the event there are negative feature vectors, face classifier 360 may calculate a ratio of the distance between the search feature vector and the closest positive feature vector to the distance between the search feature vector and the closest negative feature vector (910). The ratio may be determined using the following formula.

$$\text{Ratio} = \frac{\sqrt{\sum_{i=1}^{n} w_i (C_i - D_i)^2}}{\sqrt{\sum_{i=1}^{n} w_i (C_i - E_i)^2}}$$

where C is the search feature vector, D is the closest positive query feature vector and E is the closest negative query feature vector. Alternatively, the sums over i in the equation may not encompass the entire set of feature elements, but rather, only a subset of feature elements, as described above.

Face classifier 360 assigns a score to the search feature vector (912). When there are positive and negative feature vectors, the score assigned by face classifier 360 may be the calculated ratio. If there are no negative feature vectors, such as, for example, if a query image includes only one face, the score assigned by face classifier 360 may simply be the weighted Euclidean distance between the search feature vector and the closest positive query feature vector. In this case, face classifier 360 need not determine a ratio.

Face classifier 360 determines if other search feature vectors are available for testing against the positive and negative query feature vector (914). If so, operations 904-912 may be repeated for the next search feature vector. If not, process 508 continues to operation 916.

If only one search feature vector is tested against the query feature vector(s), only one search image may be designated as a search result image (assuming that the search feature vector is a match for the query feature vector).

If more than one search feature vector is tested against the query feature vector, face classifier 360 ranks the search feature vectors from minimum score to maximum score (916). Face classifier 360 then selects N search feature vectors having the lowest scores (918). N is the number of search feature vectors that are determined to be the same as the query face based on the scores assigned to the search feature vector. The value of N may be a pre-set value or may be the number of search feature vectors that are within a threshold score. In other words, face classifier 360 may select a predetermined number of search feature vectors with the lowest scores, or it may select all or some of the search feature vectors that have scores within a particular score threshold.

Face classifier 360 designates the images that include the faces corresponding to the N selected search feature vectors as search result images (920). In doing so, face classifier 360 may maintain the rank of the N faces in order to provide the user with search result images in order of best (most likely to include a face that is the same as the query face) to worst (less likely to include a face that is the same as the query face). Face classifier 360 also may identify the face within each search result image that corresponds to the selected search feature vector as the application-selected face.

Figure 10:
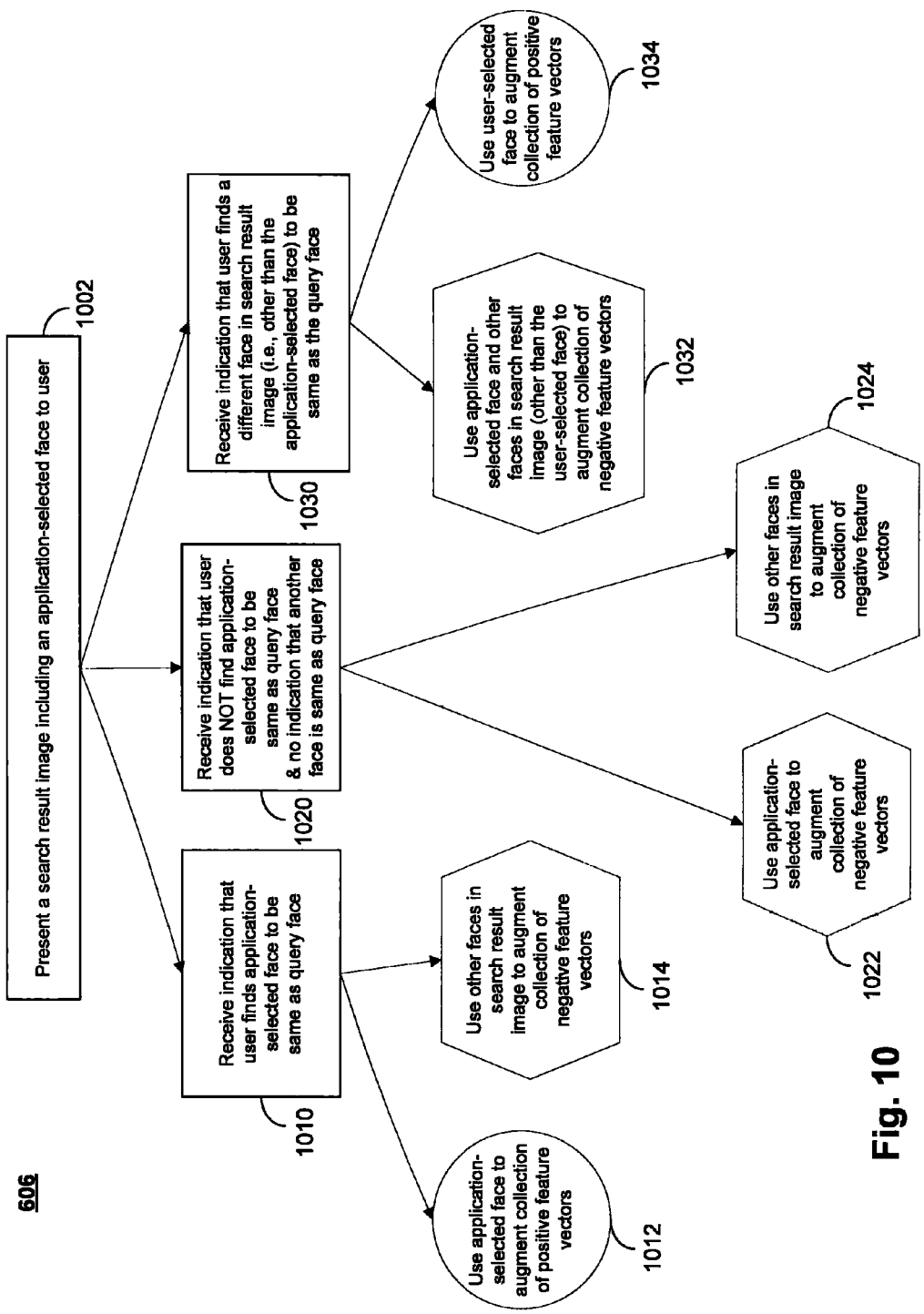

FIG. 10 is a flow chart that represents a particular implementation of operation 606 of FIG. 6 for updating search result images based on received user feedback and inferred additional feedback. Process 606 may be performed by interface manager 370, feedback manager 390 and face classifier 360.

Interface manager 370 presents a search result image including an application-selected face to a user (1002). If more than one search image includes a face that matches the query face, interface manager 370 may present the multiple search result images to the user, where each search result image includes one (or possibly more) application-selected face.

For each search result image, feedback manager 390, through the interface manager 370, may receive one of three different indications from the feedback received from a user regarding the search result images. Host 130 may receive an indication that the user finds the application-selected face in an image to be the same as the query face (1010), host 130 may receive an indication that the user does not find the application-selected face in an image to be the same as the query face (1020), or host 130 may receive an indication that the user finds a different face in the search result image (i.e., a face other than the application-selected face) to be the same as the query face (1030). The three different indications may be placed into two categories—positive and negative feedback. Feedback that indicates that the application-selected face, or another face within an image, is a match for a query face may be referred to as positive user feedback. Feedback that indicates that the application-selected face, or another face within the image, is not a match for the query feedback may be referred to as negative feedback.

Based on feedback received, feedback manager 370 may infer additional feedback. The additional feedback may be inferred from feedback received from a user explicitly or implicitly. For example, a user may explicitly or implicitly indicate that the application-selected face is a match for the query face. In this case, the user has provided positive feedback. Feedback manager 370 then may infer that any other faces within the image (i.e., faces other than the application-selected face) are not matches for the query face and thus, infer negative feedback about the other faces. In another example, a user may explicitly or implicitly indicate that the application-selected face is not a match for the query face and may not indicate explicitly or implicitly that any other face in the image is a match for the query face. In this case, feedback manager 370 may infer that all other faces within the image (other than the application-selected face, for which the user has already explicitly or implicitly provided feedback by indicating that it was not a match for the query face) are not matches for the query face. Thus, feedback manager 370 may infer negative feedback for the other faces within the image. In yet another example, a user may explicitly or implicitly indicate that although the application-selected face is not a match for the query face, another face (i.e., a user-selected face) is a match for the query face. By indicating that the user-selected face is a match for the query face (and therefore providing positive feedback for the user-selected face), feedback manager 370 may infer that any other faces within the image (other than the application-selected face, for which the user has already explicitly or implicitly provided feedback by indicating that it was not a match for the query face) are not matches for the query face. Thus, feedback manager 370 may infer negative feedback for the other faces within the image.

Face classifier 360 may use both the received explicit and implicit user feedback and the inferred additional feedback to update search result images. Positive feedback (i.e., an indication that the application-selected face is a match for the query face) may be used to augment a collection of positive feature vectors, such that the feature vector for the application-selected face may be added to the collection of positive feature vectors. Negative feedback (i.e., an indication that the application-selected face is not a match for the query face or that other non-application and non-user selected faces are not a match for the query face) may similarly be used to augment a collection of negative feature vectors with the feature vector for the application-selected face and any other faces (other than the application-selected face and any user-selected faces) for which negative feedback has been inferred.

More particularly, face classifier 360 may receive an indication that a user finds the application-selected face to be the same as a query face (1010). Based on the received indication, face classifier 360 uses the feature vector for the application-selected face to augment the collection of positive feature vectors, as described with respect to FIGS. 9A and 9B (i.e., identify the feature vector for the application-selected face as positive) (1012). Face classifier 360 also may use feature vectors for other faces within the search result image to augment a collection of negative feature vectors, also as described with respect to FIGS. 9A and 9B (i.e., identify the feature vectors associated with the other faces as negative) (1014). Once the face classifier 360 augments the collections of positive and negative feature vectors, the face classifier 360 re-runs the process shown in FIGS. 9A and 9B to obtain updated search results or sorting.

Face classifier 360 may receive an indication that a user does not find the application-selected face to be the same as a query face and there is no indication from the user that another face within the image is the same as the query face (1020). Based on the received indication, face classifier 360 may use the feature vector for the application-selected face to augment the collection of negative feature vectors (i.e., identify the feature vector for the application-selected face as negative) (1022). Face classifier 360 also may use the feature vectors for the other faces in the search result image to augment the collection of negative feature vectors (i.e., identify the feature vectors for the other faces as negative) (1024). Once the face classifier 360 augments the collections of negative feature vectors, the face classifier 360 re-runs the process shown in FIGS. 9A and 9B to obtain updated search results or sorting.

Similarly, face classifier 360 may receive an indication that a user does not find the application-selected face to be the same as a query face, but rather the user does find another face in the search result image, referred to as a user-selected face, to be the same as the query face (1030). Based on the received indication, face classifier 360 may use the feature vector for the application-selected face to augment the collection of negative feature vectors (i.e., identify the feature vector for the application-selected face as negative), and face classifier 360 also may use feature vectors for any other faces within the search result image, other than the application-selected face and the user-selected face, to augment the collection of negative feature vectors (i.e., identified as negative) (1032). Face classifier 360 further may use the feature vector for the user-selected face to augment the collection of positive feature vectors (i.e., identify the feature vector for the user-selected face as positive) (1034). Once the face classifier 360 augments the collections of positive and negative feature vectors, the face classifier 360 re-runs the process shown in FIGS. 9A and 9B to obtain updated search results or sorting.

By using both explicit and implicit user feedback, as well as inferred additional feedback, host 130 may provide updated, and future, search result images that are more accurate. In other words, search result images provided to a user are more likely to include a face that is the same as the query face. Allowing a user to explicitly provide user feedback allows the user control over the manner in which host 130 determines and provides search result images and application-selected faces. For example, a user may explicitly indicate whether an application-selected face is a match for the query face by selecting a checkbox or radio button. Receiving user feedback implicitly allows a user to interact with a search result image in a natural manner and still provide valuable information to host 130 regarding the accuracy of the present search result images and application-selected faces. For example, a user may print a search result image, thus indicating that the application-selected face within the search result image is a match for the query face. Alternatively, if the application-selected face within the search result image is indicated by the system to be a match to the query face in some manner (e.g., it is highlighted or labeled as matching the query face or is placed in a folder associated with images that include faces that match the query face), the user may perform no action, thereby implicitly confirming that the application-selected face within the search result image is a match for the query image. By inferring even more information from both explicit and implicit received user feedback, host 130 may further improve the accuracy of updated, or future, search result images and application-selected faces without requiring any extra action, effort, or information-provision (explicit or implicit) from the user. For example, host 130 may infer that additional faces within a search result image are not matches for the query face, when the user explicitly or implicitly indicates that another face within the image is a match for the query face.

Figure 11:
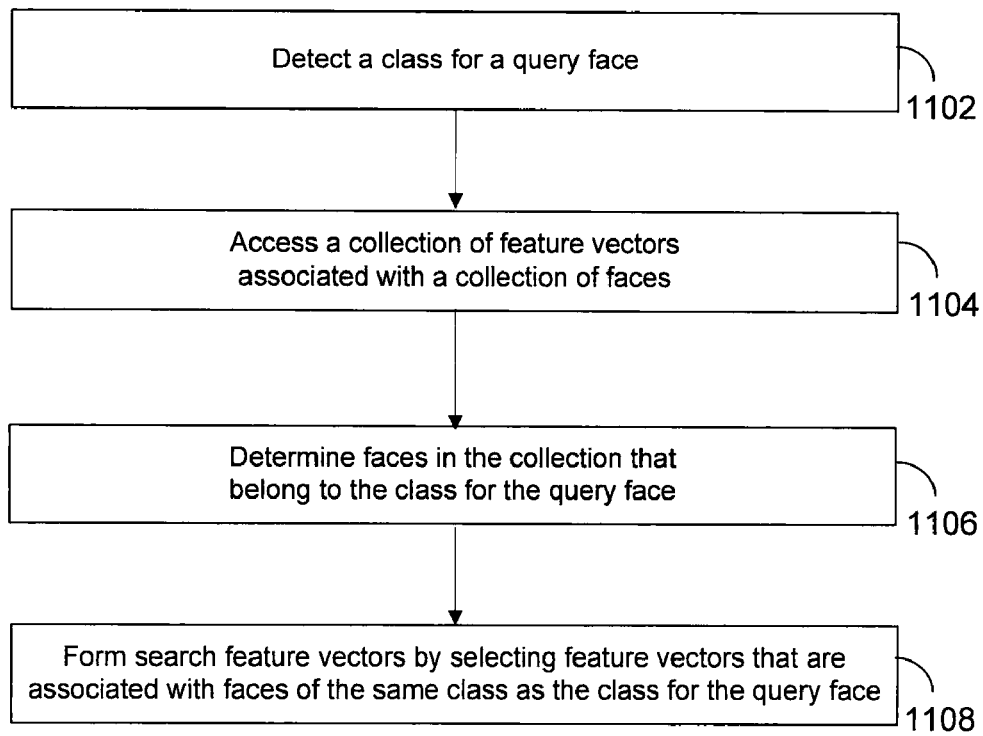

FIG. 11 is a flow chart that represents a particular implementation of operation 506 of FIG. 5 for accessing search feature vectors from stored search feature vectors. Process 506 may be performed by face classifier 360.

More particularly, process 506 may enable face classifier 360 to determine a sub-set of search feature vectors stored within a search feature vector database to be used as search feature vectors from which matches for a query feature vector may be detected. Process 506 may be performed by face classifier 360 when there are some search feature vectors that may be eliminated from consideration as matches for a query feature vector.

The elimination may be based on a class associated with a face and the feature vector formed for the face. A class may include a particular feature or attribute that may cause a dispositive result for whether a face of the particular class is, or is not, the same as a query face. Classes may include, for example, gender, skin tone, hair color or type and age.

Face classifier 360 detects a class for a query face (1102). For example, face classifier 360 may determine that the query face has a class of female. Face classifier 360 also accesses a collection of feature vectors associated with a collection of faces (1104). The feature vectors accessed may be the search feature vectors formed for faces within images uploaded to a photo album and stored as search faces within search images. In the present example, feature vectors associated with a collection of faces of all classes may be accessed.

Face classifier 360 determines faces in the collection that belong to the class for the query face (1106). In the present example, faces that belong to the female class may be detected.

Face classifier 360 forms a set of search feature vectors by selecting feature vectors that are associated with faces of the same class as the query face (1108). More particularly, only feature vectors that are associated with faces of the same class as the query face (here, the female class) are included as search feature vectors for the present search, and thus, may be considered as potentially the same as the query face. In this configuration, search result images may be of better quality (e.g., more likely to be a match for the query face), or the search for faces that are the same as the query face may be more efficient, because faces having a class that is different from the class for the query face may have already been removed from consideration.

Figure 12:
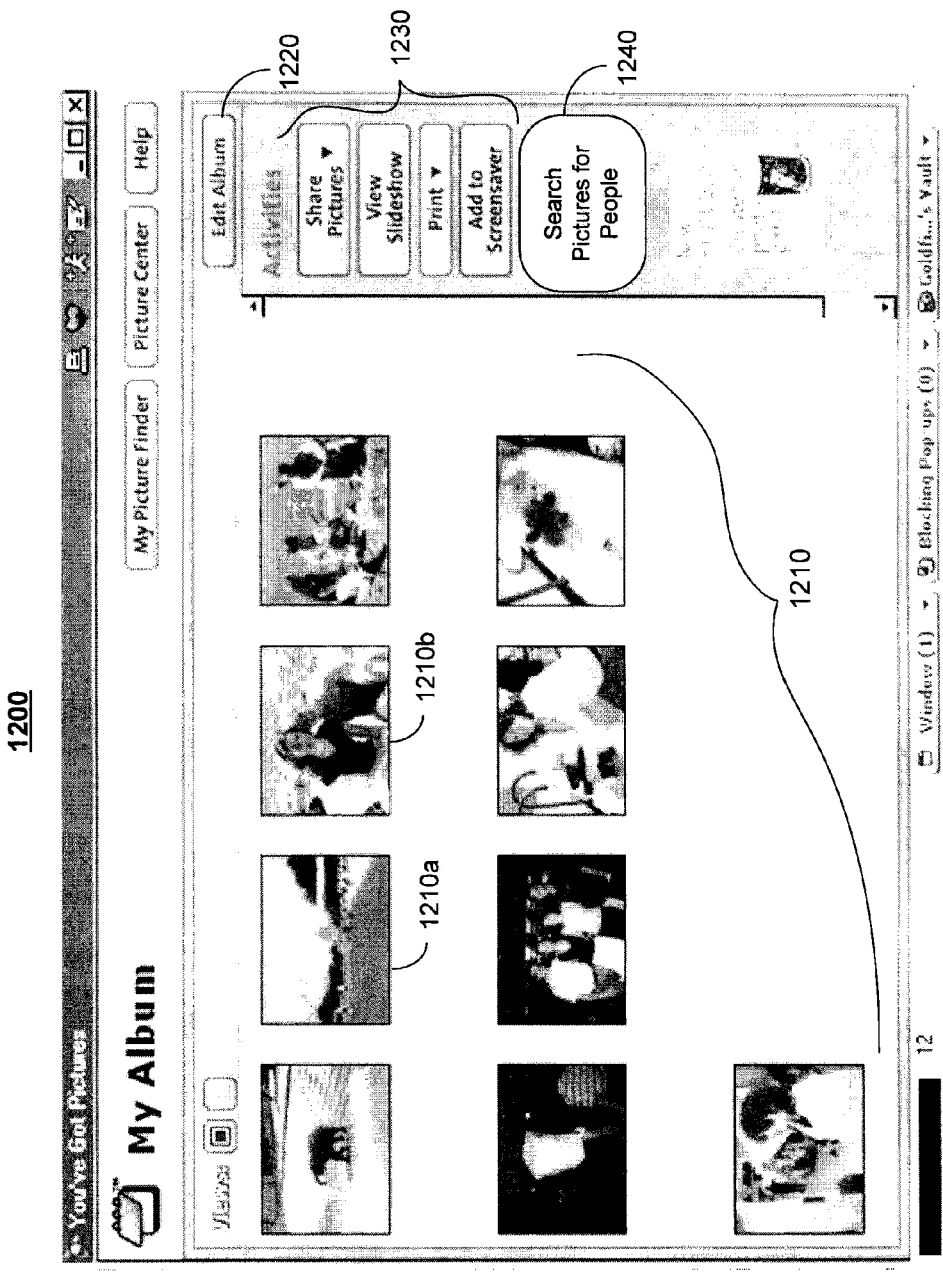
FIG. 12 is an example of a user interface (UI) configured to enable a user to organize and search images in a photo album.

FIG. 12 is an example of a UI 1200 configured to enable a user to organize and search images in a photo album. UI 1200 includes images 1210. Some of images 1210 include faces, such as, for example, image 1210b, while some images do not, such as, for example, image 1210a.

UI 1200 also includes an Edit Album button 1220 that, when selected, may allow a user to upload images to the photo album, delete images from the photo album, name the photo album and create a folders within the photo album. UI 1200 further includes other buttons 1230 that may allow a user to perform activities such as, for example, sharing and printing images in the photo album. Finally, UI 1200 includes a Search Pictures for People button 1240 which may allow a user to provide a query face and search the images within the photo album for images that include a face that is the same as the query face. For instance, the Search Pictures for People button 1240 may invoke UI 1300 of FIG. 13.

Figure 13:
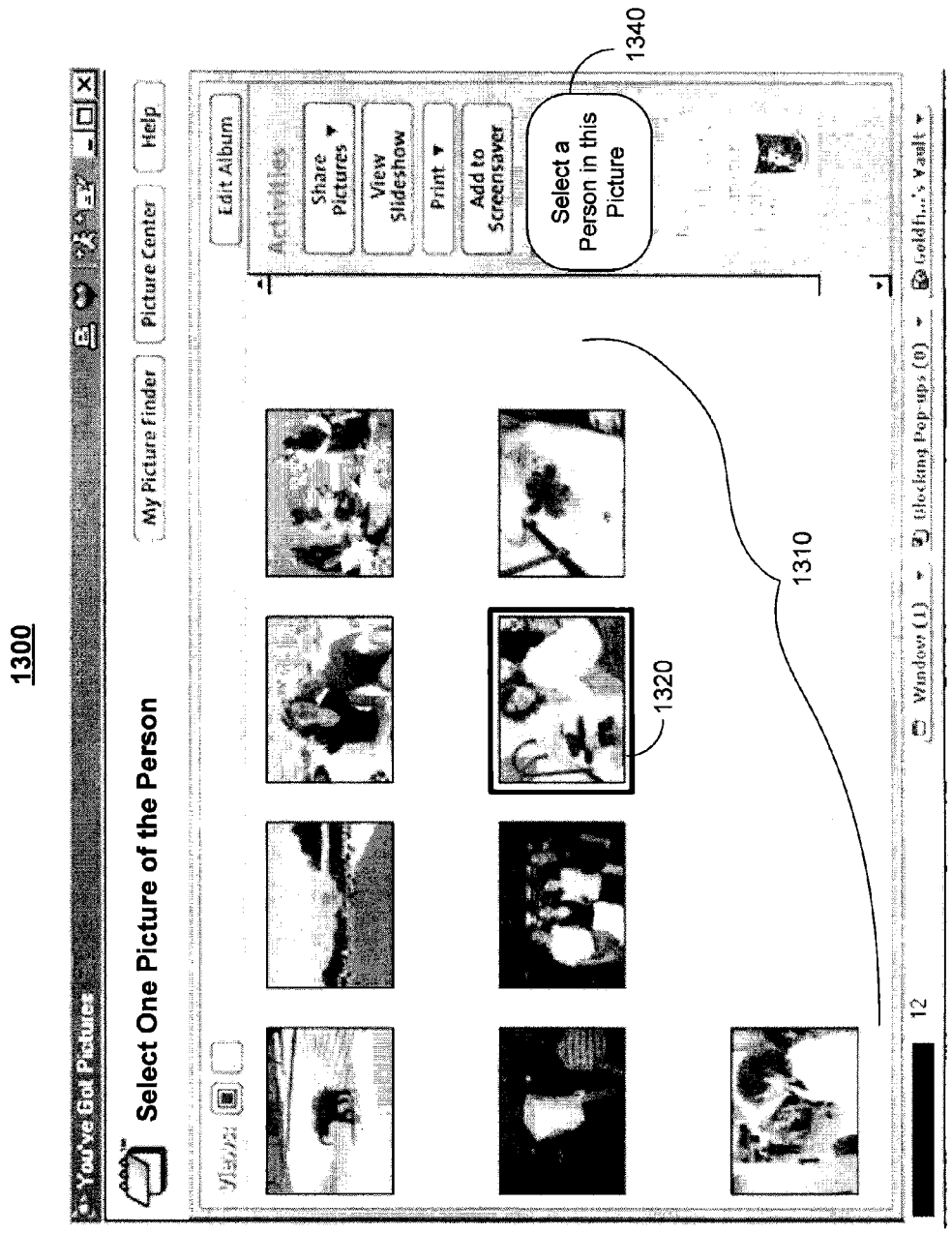
FIG. 13 is an example of a UI 1300 configured to enable a user to provide a query image to initiate a search for images that include faces that are the same as a query face within the query image.

FIG. 13 is an example of a UI 1300 configured to enable a user to provide a query image to initiate a search for images that include faces that are the same as a query face within the query image. UI 1300 includes images 1310. Images 1310 may be all images within a particular photo album or a sub-set of images within a particular photo album, such as images within a folder. A user may select an image, such as image 1320, as a query image. To select a face within the query image, a user may click on a Select a Person in this Picture button 1340. Doing so may invoke UI 1400 of FIG. 14, as discussed below, to be presented to the user.

Figure 14:
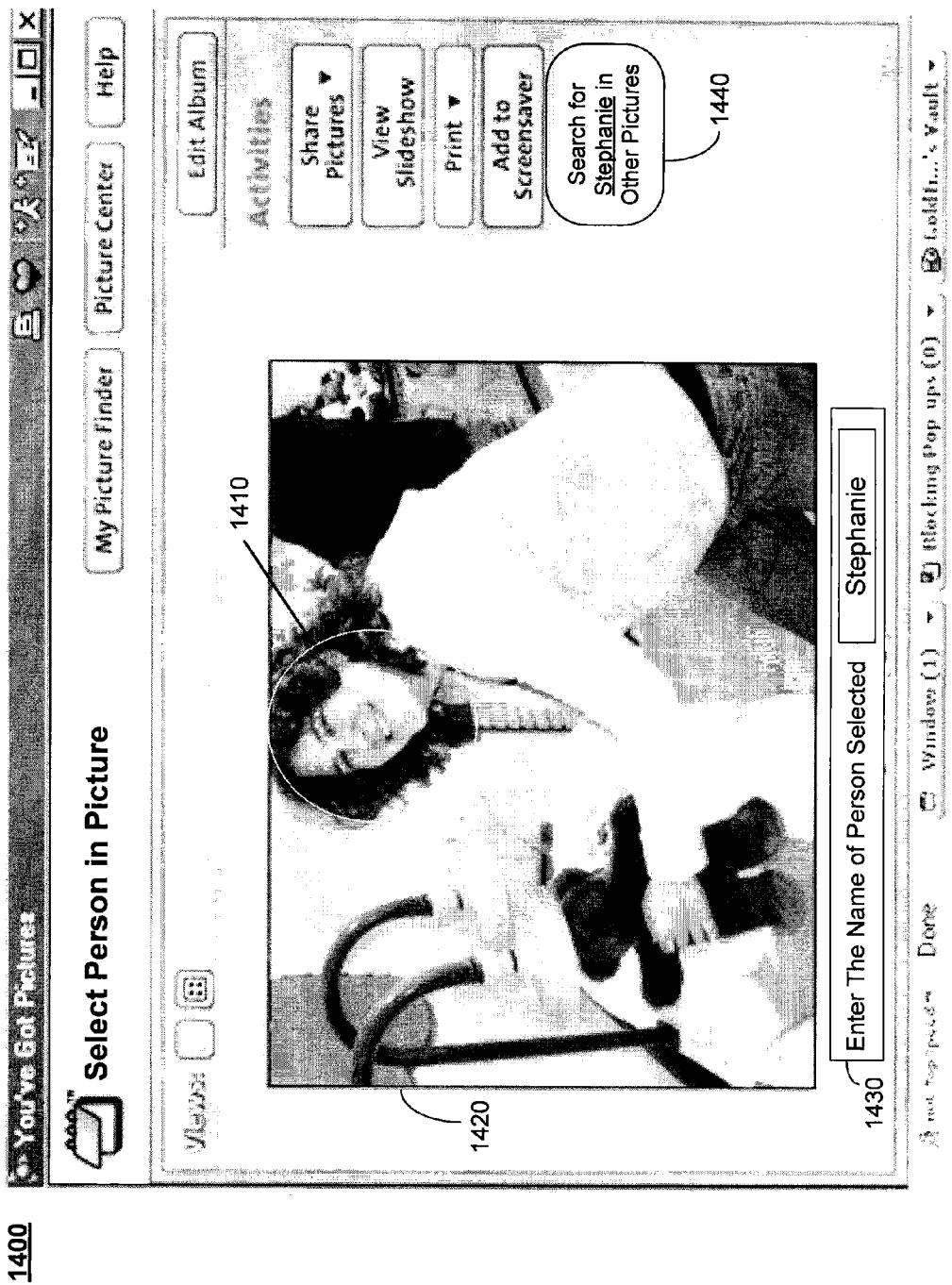
FIG. 14 is an example of a UI 1400 configured to enable a user to select a query face within a query image to initiate a search for images that include faces that are the same as the query face.

FIG. 14 is an example of a UI 1400 configured to enable a user to select a query face within a query image to initiate a search for images that include faces that are the same as the query face. UI 1400 includes image 1420. In some implementations, a user may select a face in image 1420 to serve as a query face by selecting an area near the face with a mouse, stylus or other pointer device, by drawing any shape around a face, by hovering a mouse over a face, or by some other method that designates the face as a query face. In the example shown, a user has selected a face in image 1420 as the query face by drawing a circle 1410 around the face.

UI 1400 also enables a user to enter the name of the person selected in text entry box 1430. The user has entered the name "Stephanie" as the name of the person whose face has been selected by circle 1410. Allowing a user to enter a name associated with the selected query face may allow a user to interact with UI 1400 in a more natural way.

By selecting search button 1440, a user may initiate a search for other images in the photo album that include a face that is the same as the query face. Search button 1440 may be customized, as shown, to include the name of the person associated with the selected query face. For example, search button 1440 indicates that a user may Search for Stephanie in Other Pictures.

Figure 15:
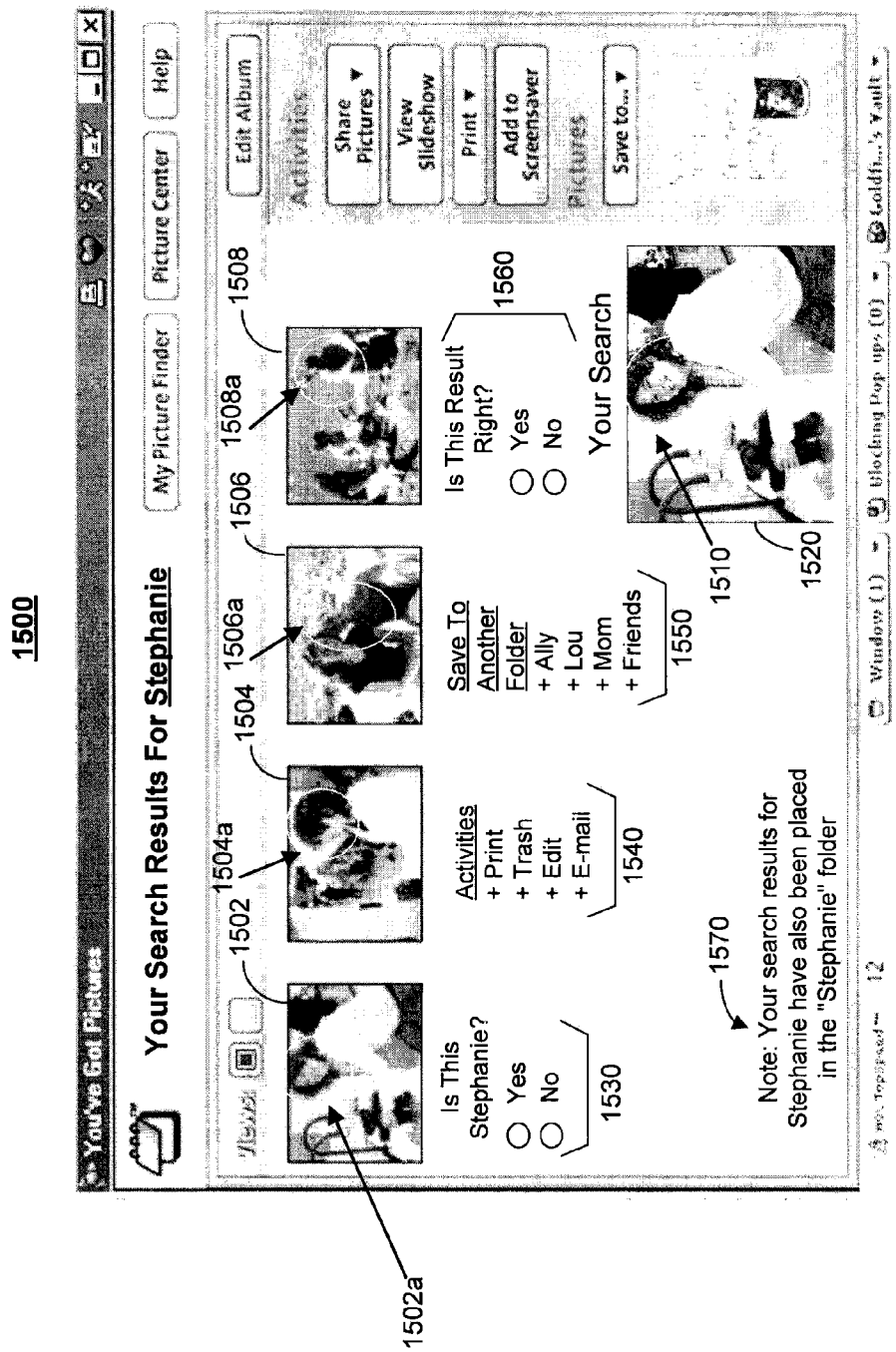
FIG. 15 is an example of a UI 1500 configured to present search result images that include an application-selected face in response to a search for images that include faces that are the same as a query face and to receive user feedback regarding the search result images.

FIG. 15 is an example of a UI 1500 configured to present search result images that include an application-selected face in response to a search for images that include faces that are the same as a query face and to receive user feedback regarding the search result images. UI 1500 includes search result images 1502-1508 that have been determined to include a face that is a match for a query face. Search result images 1502-1508 each include an application-selected face 1502a-1508a. The application-selected faces are faces within the search result images that have been determined to be the same as the query face.

UI 1500 may enable a user to provide feedback regarding the search result images 1502-1508, and more particularly, provide feedback regarding the application-selected faces 1502a-1508a within the search results. UI 1500 may solicit feedback from a user in a variety of ways. UI 1500 may ask a user whether the application-selected face represents the person sought by the user. For example, UI 1500 may include an input request 1530 that asks the user "Is this Stephanie?" with respect to application-selected face 1502a in search result image 1502. Input request 1530 also may enable a user to enter a "yes" or "no" response by selecting a corresponding radio button. This type of user feedback may be referred to as explicit user feedback.

UI 1500 also may present a user with a list of activities that may be performed with respect to a particular search result image. For example, activity list 1540 allows a user to print, trash, edit, or e-mail search result image 1504. UI 1500 may present a user with a list of folders to which the user may save a search result image. For example, UI 1500 may include folder list 1550 configured to allow a user to select a folder, here related to a particular person, to which search result image 1506 may be saved. In some implementations, a search result image may be saved to more than one folder. For example, search result image 1506 includes two faces—one belonging to Stephanie and the other belonging to Ally. In this case, a user may wish to save the search result image 1506 to both a folder for pictures that include Stephanie and a folder for pictures that include Ally. In some implementations, a search result image may be automatically saved to a folder associated with a particular person. For example, user note 1570 within UI 1500 indicates that search result images 1502-1508 have also automatically been placed in a folder associated with Stephanie. In this case, a user may indicate that one of search result images 1502-1508 is a match for the query face of Stephanie by not interacting with one of search result images 1502-1508. This type of feedback may be referred to as implicit user feedback because the user's inaction implies that the application-selected face is a match for the query face.

UI 1500 also may request a user to indicate whether the application-selected face is a match for the query face. For example, UI 1500 may include input request 1560 that asks the user "Is This Result Right?" with respect to application-selected face 1508a in search result image 1508. Input request 1560 also may enable a user to enter a "yes" or "no" response by selecting a corresponding radio button. This type of feedback also may be referred to as explicit user feedback. If the user selects "no" to indicate that the application-selected face is not a match for the query face, an additional UI may be presented to the user, such as, for example, UI 1600 as discussed below.

UI 1500 also includes query image 1520 including query face 1510, as may be provided by the user in UIs 1300 and 1400 of FIGS. 13 and 14.

Figure 16:
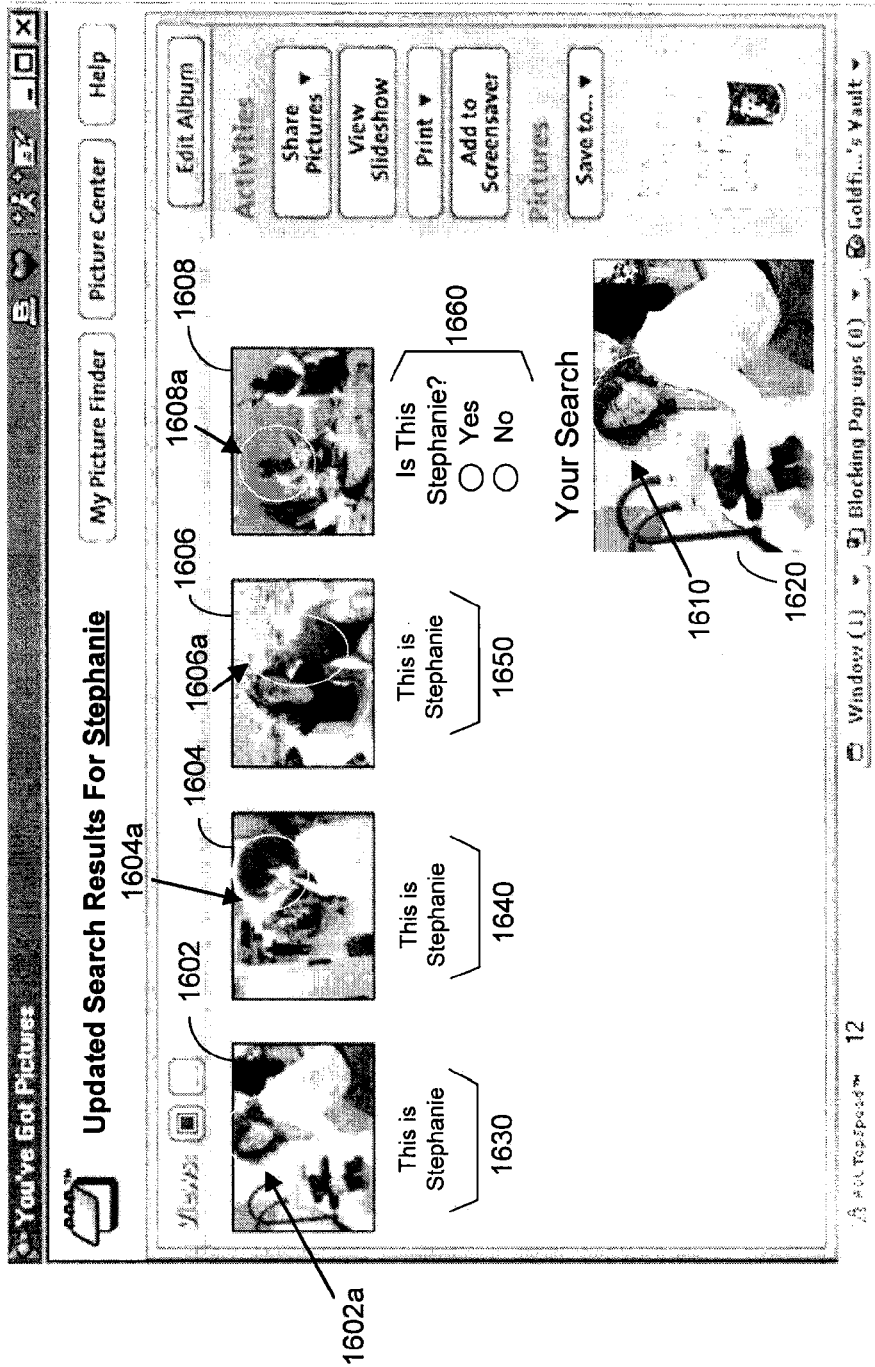
FIG. 16 is an example of a UI 1600 configured to present a user with updated search result images provided in response to a search for images that include a face that is the same as a query face.

FIG. 16 is an example of a UI 1600 configured to present a user with updated search result images provided in response to a search for images that include a face that is the same as a query face. As described above, both received explicit and implicit user feedback and additional feedback that may have been inferred may be used to update search result images. More particularly, the explicit and implicit user feedback provided in UI 1500 of FIG. 15 may be used to update search result images and enable presentation of UI 1600 to a user to present updated search result images.

UI 1600 includes search result images 1602-1608 that include application-selected faces 1602a-1608a. Based on the user feedback provided in UI 1500 of FIG. 15, UI 1600 may indicate that application-selected faces 1602a-1608a within search result images 1602-1606 are, in fact, a match for the query face by indicating "This is Stephanie," as shown at 1630-1650.

Also based on the user feedback provided in UI 1500 of FIG. 15, UI 1600 may provide a new search result image that includes an application-selected face that is the same as a previous application-selected face (not shown) or a search result image with a new application-selected face. For example, UI 1600 may include search result image 1608, which was previously presented as a search result image in UI 1500 of FIG. 15, with a new application-selected face 1608a. The new application-selected face may be determined in response to an indication by the user that the previous application-selected face was not a match for the query face, as well as other information obtained from the user feedback provided in UI 1500 of FIG. 15 and any additional feedback inferred therefrom.

Because the user has not provided feedback on new application-selected face 1608a within search result image 1608, UI 1600 may be configured to enable a user to indicate whether new application-selected face 1608a is a match for the query face by providing input request 1660 that asks "Is this Stephanie?" and enables a user to respond by selecting a "yes" or "no" radio button.

UI 1600 also includes query image 1620 including query face 1610, as provided by the user in UIs 1300 and 1400 of FIGS. 13 and 14.

As described above, in some implementations, images may be sorted based on the face(s) contained in the image, in addition, or as an alternative, to allowing a user to provide a query face and perform a search for images that include faces that are the same as a query face. In such implementations, a user may provide a set of images that contain faces that have not been sorted and/or labeled and those images may be clustered into groups of folders representing each of the different faces found within the images, using, for example, the techniques described with respect to FIG. 17. For example, a user's photo album may include three different people within images that contain faces that have not been sorted and/or labeled. A first set of images may include a face corresponding to person A, a second set of images may include a face corresponding to person B and a third set of images may include faces corresponding to person C. In this implementation, the set of images containing person A may be clustered together into a folder for person A (folder A), the set of images containing person B may be clustered together into a folder for person B (folder B), and the set of images containing person C may be clustered together into a folder for person C (folder C). A user then may label the folders with the name of the person whose face is included in each of the images within the folder. For example, if the name of person A is Ally, a user may label folder A, and thus the faces within images included in folder A, "Ally."

Once the images in the photo album have been clustered into folders and labeled, new images that are uploaded to the photo album or any images that were present in the photo album, but not sorted for some reason, may automatically be placed into an appropriate group and given the group label.

The facial recognition techniques described above may be used to determine to which groups the new or unsorted images belong. For example, the already sorted faces that have been explicitly or implicitly confirmed by a user and/or labeled faces may be referred to as query faces because matches to the sorted and/or labeled faces among the unknown or unlabeled faces (referred to as search faces) may be sought. The techniques described above then may be used to search the unsorted and/or unlabeled faces for faces that match a query face, and the unsorted and/or unlabeled face then may be placed into the group or folder that includes images that contain the query face.

More particularly, a set of images that contain faces that have not been sorted and/or labeled may be sorted into groups based on the faces within the set of images. For example, images may be sorted into groups that correspond to faces of five different people. The user then may designate a particular label for each of the groups. An image that includes a new face, or a face that has for some reason not already been sorted into one of the groups, then may be automatically sorted into one of the labeled groups. To that end, the new face within the new image may be detected and a new feature vector may be determined for the new face. A distance between the new feature vector and the feature vectors of the faces within each of the five groups then may be determined. In this way, the closest feature vector to the new feature vector within each group may be identified. For example, a weighted Euclidean distance may be determined between the new feature vector and the feature vector in each group that is the closest to the new feature vector. The weighting may be applied to features that have been determined to be good discriminators between faces of different groups, as described above. The weighted Euclidean distances between the new feature vector and the closest feature vector in each group then may be compared to one another to determine to which group the new face most likely belongs. The group for the feature vector associated with the smallest weighted Euclidean distance from the new feature vector may be considered the group to which the new feature vector most likely belongs.

Once the group to which the new face most likely belongs is determined, a second determination may be made as to whether the new image that includes the new face should be placed in that group. For example, it may be determined that the new face is closest to the faces in the second of the five groups. However, the determination that the new face is closer to the second group than any of the first, third, fourth or fifth groups, does not conclusively indicate that the new face is the same as the faces within the second group. Thus, to determine whether to place the new face into the group to which it has been determined the new face most likely belongs, a distance between the new feature vector and the positive feature vectors associated with the group (e.g., the feature vectors for all faces within the group) and the negative feature vectors associated with the group, if any (e.g., the feature vectors for all faces that are not in the group, if any) may be determined. A ratio between the two distances then may be determined to provide a score for the new feature vector with respect to the group, as described above. If the score satisfies a threshold, the new image that includes the new face may be placed into the determined group. If the score fails to satisfy the threshold, the new image that includes the new face may not be placed into the group, but may instead be placed into a group of unknown images. In some implementations, the first and second determinations may be combined into a single determination.

Figure 17:
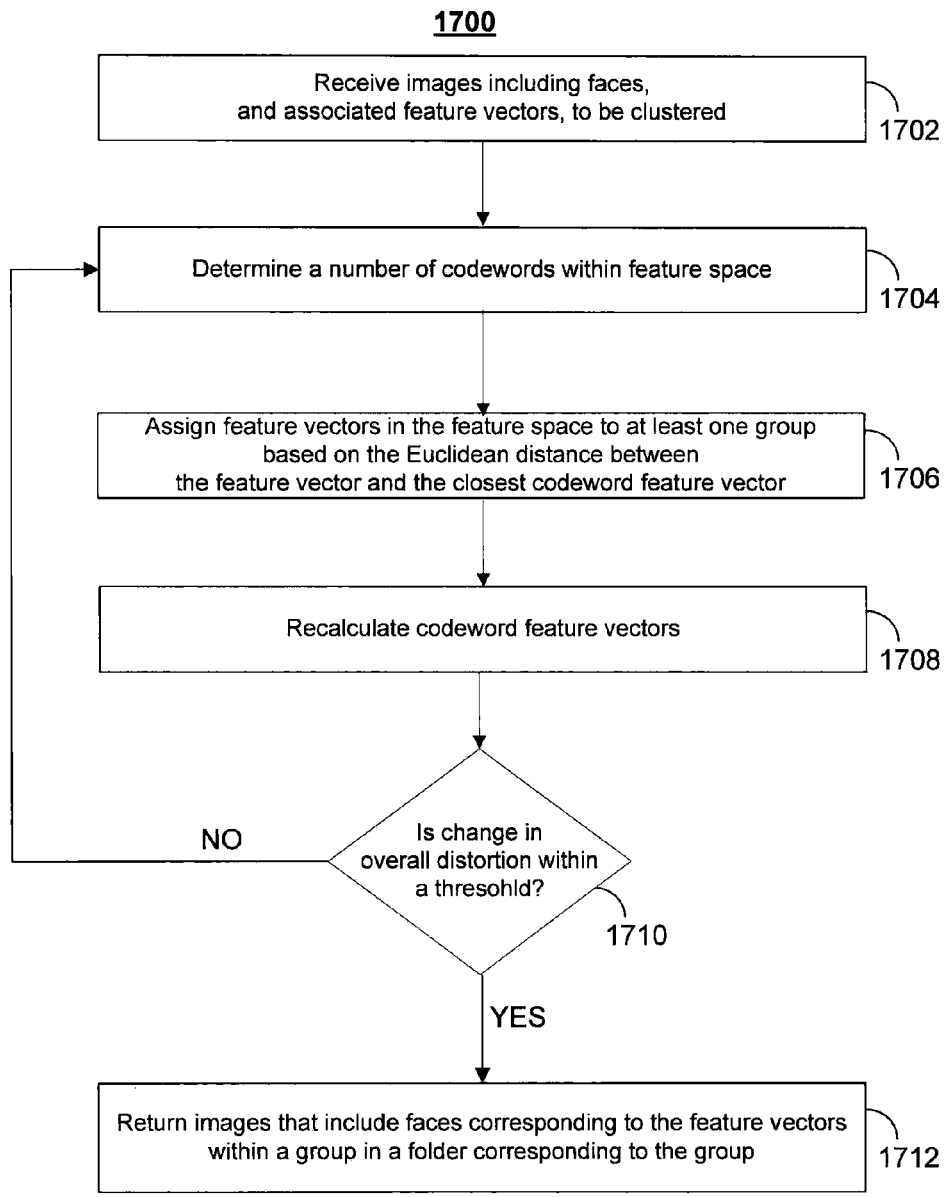
FIG. 17 is a flow chart of a process for clustering a set of images in a photo album that contain unsorted and/or unlabeled faces.

FIG. 17 is a flow chart of a process 1700 for clustering a set of images in a photo album that contain unsorted and/or unlabeled faces. The following discussion describes one implementation in which the operations of the processes are performed by host 130 generally. However, other implementations may employ different components to carry out the operations of the process. For example, the operations of process 1700 may be performed by client 110 rather than host 130.

Host 130 receives images including faces, and associated feature vectors, to be clustered (1702). The clustering may be performed upon uploading of the images to the photo album, in response to some user action, such as, for example, a user indication to sort images or initialize photo album folders, or upon the occurrence of some other event that may or may not be initiated by the user.

Host 130 determines a number of codewords within the feature space (1704). Clusters of images including faces that are determined to correspond to the same person may be determined by using standard clustering techniques on the feature vectors associated with the faces in the images to be clustered. The clusters may be formed, for example, by using an unsupervised learning algorithm such as k-means clustering. The k-means clustering algorithm determines a number of codewords, such as, for example, k centroids, within the feature space. A centroid, within a feature space may represent a center of mass of the feature vectors for all faces within the images to be sorted in that feature space. A codeword may be represented as a feature vector referred to as a codeword feature vector. The feature vectors for the faces within the images to be sorted may make up the feature space.

Host 130 may assign a feature vector to a group based on the Euclidean distance between the feature vector and the closest codeword feature vector (1706). For k codewords, host 130 may determine a Euclidean distance between each feature vector in the feature space and each of the k codeword feature vectors. Each feature vector may be assigned to a group based on which codeword the feature vector is closest to (i.e., which codeword feature vector is the smallest distance from the feature vector to be grouped). Thus, each group may be associated with a particular one of the k codewords (and also with a particular one of the k codeword feature vectors).

Upon assignment to a group of all feature vectors, host 130 recalculates the codeword feature vectors by, for example, determining an average of the feature vectors within each group (1708). The average of the feature vectors in a group associated with a particular one of the k codewords may now be used to represent the codeword feature vector associated with the group. At this point, the feature vectors within a group may be reassigned to a different group if the distance between the feature vector and a codeword feature vector other than the codeword feature vector related to the group in which the feature vector is currently present, is smaller than the distance between the feature vector and the codeword feature vector for the current group.

Host 130 determines if the change in overall distortion between the feature vectors and the codeword feature vector for the group in which the feature vectors belong (i.e., the sum of the distances between the feature vectors in a group and the codeword feature vector for the group across all groups) is within a threshold (1710).

If the change in overall distortion is within the threshold, host 130 presents the images that include faces that correspond to the feature vectors within each group to the user in a folder corresponding to the group (1712). If the change in overall distortion is not within the threshold, host 130 repeats operations 1704-1708.

In some implementations, all images within the photo album at the time the clustering is initiated may be sorted into groups and folders. Alternatively, only a subset of the images within the photo album at the time of the clustering may be sorted.

Also, once the clustering has been completed, a user may provide explicit or implicit feedback about the faces within the images in each group or folder and additional information may be inferred about the images in each group or folder based on the feedback received from the user. For example, a user may indicate a name to be associated with application-selected faces within the images grouped into the folder. As another example, a user may indicate that an application-selected face within a particular sorted search result image belongs in a particular folder by failing to interact with the image, such as, for example, by not moving the image to a different folder. Similarly, a user may indicate that an application-selected face within a particular sorted search result image does not belong in a particular folder by, for example, moving the image to a different folder or by assigning a different name to the application-selected face within the search result image.

Figure 18:
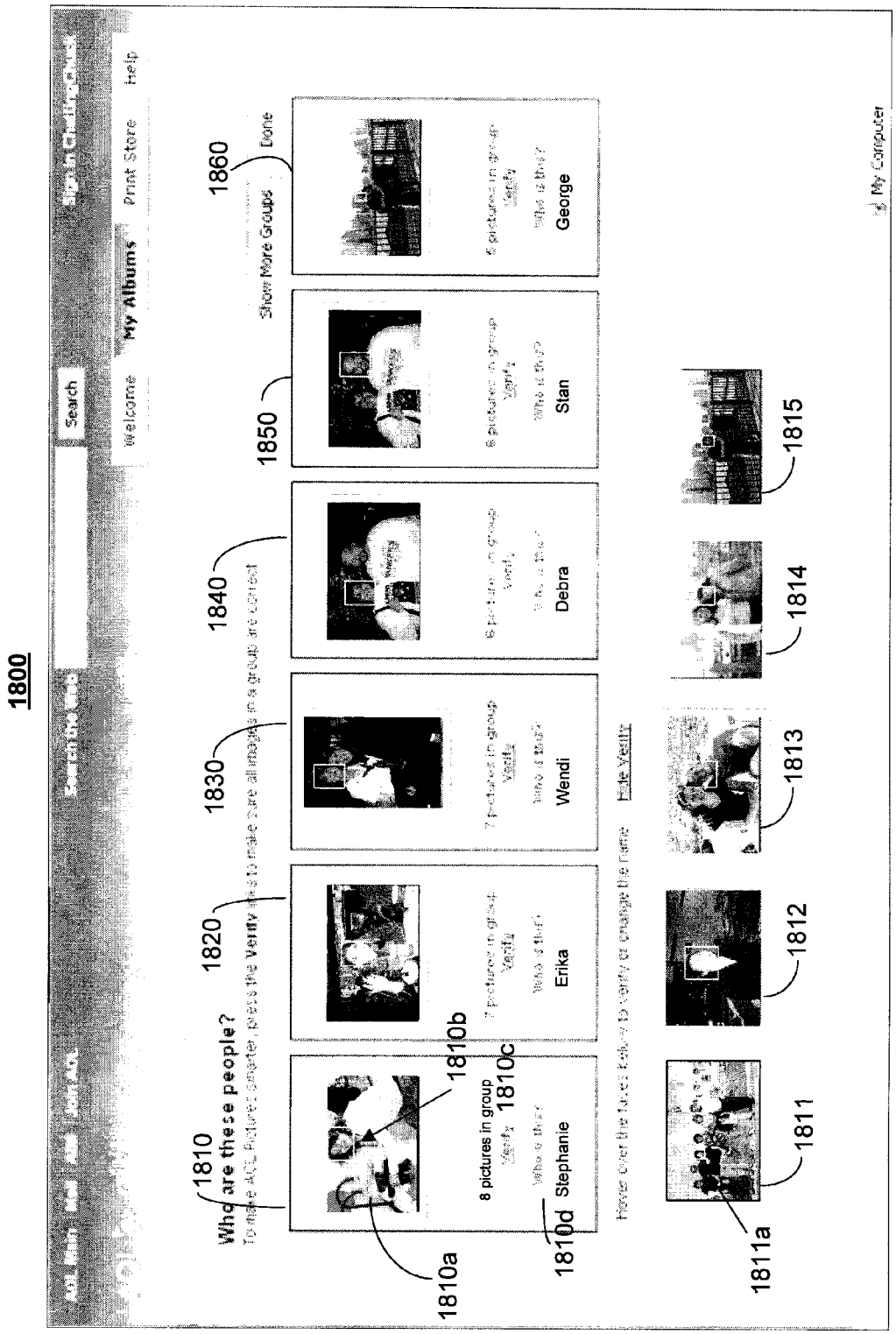
FIG. 18 is an example of a UI configured to present images that have been clustered.

FIG. 18 is an example of a UI 1800 configured to present images that have been clustered. UI 1800 includes image groups 1810-1860. Each image group includes a representative image that includes an application-selected face that the system has determined is the same as at least one face within every other image within the image group. For example, image group 1810 includes representative image 1810a and application-selected face 1810b.

For each image group, UI 1800 also includes a "verify" hyperlink, such as, for example, verify hyperlink 1810c of image group 1810. A user may select the verify hyperlink to view some, or all, of the images within an image group and verify whether the images include a face that is the same as the application-selected face shown in the representative image. For example, a user may select hyperlink 1810c of image group 1810 and be presented with additional images 1811-1815, where each of the additional images 1811-1815 includes an application-selected face 1811a-1815a.

Upon viewing additional images within a particular image group, a user may provide positive feedback for an application-selected face within an image by not interacting with the image (e.g., by leaving the image in the image group). Similarly, a user may provide negative feedback for an application-selected face within an image by moving the image to another image group. A user may do so by, for example, dragging the image into a different image group or hovering a mouse or stylus over the application-selected face and indicating (via a text box or drop down menu (not shown)) a name for the application-selected face other than the name associated with the image group.

UI 1800 is also configured to allow a user to name a group of images by entering a name into the "Who is this?" text box, such as, for example, text box 1810d of image group 1810 or by selecting a name from a drop down list (not shown). For example, a user has provided the name "Stephanie" for image group 1810 and the name "Erika" for image group 1820.

Any images that are newly uploaded to the photo album, or for some reason were not previously sorted, may be automatically added to an image group and labeled with the name provided by the user for the image group, as described above. Any images that include faces that do not match faces within any of the pre-existing image groups may be added to an unknown image group. The user may be alerted that additional images have been added to the group by, for example, highlighting the newly added images, providing a pop-up indication when the user clicks on an image group, or indicating that the number of images in an image group has changed. For example, a user may upload an additional image that includes a face corresponding to Stephanie. The image may automatically be added to image group 1810 and labeled "Stephanie."

In addition, once user feedback is received or inferred, as described above, the images in the groups may be re-sorted based on the feedback. For example, a user may indicate that a face corresponds to Erika even though it has been placed in the Stephanie folder. In this case, the image may be re-sorted and placed into the Erika folder. Based on this feedback, i.e., information about a face that is Erika and a face that is not Stephanie, other images that contain faces that have not been confirmed as correct by the user in some manner also may be re-sorted and moved from one group to another.

Figure 19:
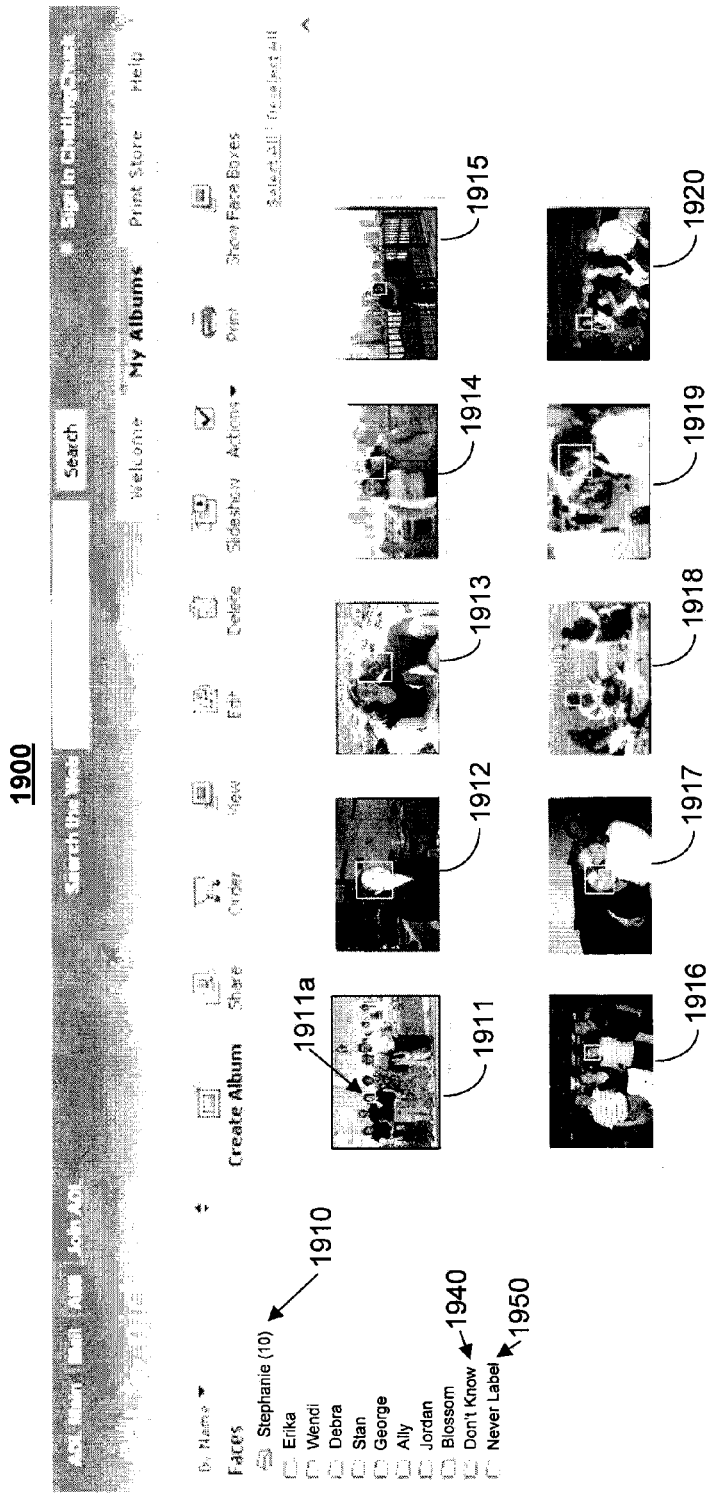
FIG. 19 is an example of a UI configured to present folders such that the contents of a particular folder include search result images that contain the same face.

FIG. 19 is an example of a UI 1900 configured to present folders such that the contents of a particular folder includes search result images that contain the same face. UI 1900 includes folders that each correspond to a particular image group, such as, for example, folder 1910 that corresponds to image group 1810 of FIG. 18 and which has been labeled "Stephanie." Each folder includes search result images that contain faces that system 300 has determined to belong to a particular person. The determination that an image includes a particular face may have been based solely on a determination by system 300, as described above, or may be the result of received user feedback or inferred additional information. When a particular folder, such as folder 1910 is selected, the images within the folder are displayed. For example, images 1911-1915 contain a face belonging to Stephanie, and thus have been grouped into the "Stephanie" folder 1910. The face that belongs to Stephanie in each of the images 1911-1915 are shown by a white box, such as, for example, box 1911a in image 1911, around the face.

The number next to the folder label, such as, for example, "10" next to the "Stephanie" folder may indicate the number of images that reside in the folder. In some instances, there may be a difference between the number next to the folder label and the number that was provided next to the image group in a UI, such as UI 1800 of FIG. 18. For example, image group 1810 of FIG. 18, which includes images that contain "Stephanie" was indicated to include 8 images. However, as noted, the "Stephanie" folder 1910 includes 10 images. In one example, the discrepancy may indicate that new images have been uploaded and automatically added by the system to the "Stephanie" group. In another example, the increase in number of images in the "Stephanie" group may be due to only a subset of images within the group being provided to the user for verification in UI 1800. In yet another example, the folder may now include 10 images due to an automatic re-sorting of images among the folders or as the result of a user providing user feedback by, for example, moving images from other folders into the "Stephanie" folder.

UI 1900 also includes folders 1920 and 1930 that include search result images that contain faces that have not been matched to the faces within any one of the pre-existing folders. For example, UI 1900 includes folder 1920, which is a folder that includes search result images that contain unknown faces, i.e., search results images that contain application-selected faces that have not yet been identified by either the user or the system 300. In another example, UI 1900 includes folder 1930, which is a folder that includes search result images that a user has indicated should never be labeled. A user may do so when the application-selected face is either not a face at all, such as, for example, when the application-selected "face" is a chair or a piece of wall, or the application-selected face is a face that is not of interest to the user, such as, for example if the user has no desire to either identify the face or have the system identify the face at any time in the future. For example, a user may not wish to identify, nor have the system identify, a face of a person that is unknown to the user, but is included in an image that contains lots of faces in a crowd.

A user may examine the images within each folder to determine whether the images within each folder have been appropriately sorted into that folder. As such, a user may provide explicit or implicit user feedback about the images in each folder and additional information may be inferred about the images in each group or folder based on the feedback received from the user. For example, a user may indicate that an application-selected face within a particular search result image has been appropriately placed in a particular folder by failing to interact with the image by, such as, for example, not moving the image to a different folder. Similarly, a user may indicate that an application-selected face within a particular image has not been appropriately placed in a particular folder by, for example, moving the image to a different folder or by assigning a different name to the application-selected face within the search result image. A user may be able to assign a name to an application-selected (or other) face within an image by, for example, right clicking on the face, using a pull down menu, or entering a name in a text box.

Figure 20:
FIG. 20 is an example of a UI configured to present an indication of multiple application-selected faces within a single search result image.

FIG. 20 is an example of a UI 2000 configured to present an indication of multiple application-selected faces within a single search result image. UI 2000 includes a search result image 2010. Search result image 2010 includes 6 application-selected faces 2011-2016. UI 2000 also includes an indication of names associated with each of the application-selected faces 2011-2016. For example, UI 2000 includes name indication 2021 indicating that application-selected face 2011 has been labeled "Debra." A user may examine search result image 2010 and provide user feedback about one or more of the application-selected faces. For example, the user may indicate that all of the application-selected faces 2011-2016 have been accurately labeled by, for example, failing to interact with search result image 2010. In another example, the user may indicate that one or more of the application-selected faces 2011-2016 have been incorrectly labeled by one of the methods described above with respect to FIGS. 18 and 19.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Computer-useable mediums suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for recognizing faces within images, the method comprising:
   accessing at least one query face;
   determining a set of search result images, wherein a search result image includes an application-selected face that is determined to be the same as the query face;
   providing an indication of the search result images to a user;
   receiving an indication that the user has caused at least one of the provided search result images to be printed;
   determining, by at least one processor, that a face in the printed search result image matches the query face; and
   updating the set of search result images based on the determination that the face in the printed search result image matches the query face.

2. The method of claim 1 wherein determining a set of search result images includes:
   creating a query feature vector for the query face;
   forming a set of search feature vectors by creating one or more search feature vectors for faces within a set of search faces;
   determining distances between the query feature vector and the search feature vectors;
   selecting one or more search feature vectors that are within a selected distance of the query feature vector; and
   designating images that include faces that correspond to the selected search feature vectors as the set of search result images.

3. The method of claim 2 wherein forming a set of search feature vectors includes:
   detecting a class for the query face;
   determining faces in a set of faces that have the same class as the query face; and
   forming the set of search feature vectors by selecting feature vectors that correspond to the determined faces.

4. The method of claim 2 wherein determining distances between the query feature vector and the search feature vectors comprises determining a weighted Euclidean distance between the query feature vector and each of the search feature vectors.

5. The method-of claim 2 wherein creating the query feature vector comprises:
   locating the query face within a query image;
   detecting facial features of the query face;
   warping the query face based on the detected facial features;
   extracting information regarding the detected facial features from the warped face; and
   forming the query feature vector based on the extracted information.

6. The method of claim 5 further comprising:
   detecting non-face based features from the query image;
   extracting information regarding the non-face based features from the query image; and
   forming the query feature vector based on the extracted information regarding the detected non-face based features and the extracted information regarding the detected facial features.

7. The method of claim 2 wherein:
   accessing at least one query face comprises accessing multiple query faces;
   creating a query feature vector for the query face comprises creating a query feature vector for each of the multiple faces; and
   determining distances between the query feature vector and the search feature vectors includes determining distances between the multiple query feature vectors and the search feature vectors.

8. The method of claim 2 further comprising:
   identifying negative faces that are determined to not be the same as the query face; and
   creating negative feature vectors for the negative faces,
   wherein:
   accessing at least one query face comprises accessing multiple query faces;
   creating a query feature vector for the query face comprises creating a query feature vector for each of the multiple faces; and
   determining distances between the query feature vector and the search feature vectors includes determining distances between the multiple query feature vectors and the search feature vectors and determining distances between the negative feature vectors and the search feature vectors.

9. The method of claim 1, further comprising:
   inferring additional feedback based on the determination that the face in the printed search result images matches the query face,
   wherein updating the set of search result images includes updating the set of search result images based on the determination that the face in the printed search result images matches the query face and the inferred additional feedback.

10. The method of claim 9 wherein the inferred additional feedback includes information about faces in the search result images other than the face in the printed search result.

11. The method of claim 9 wherein the inferred additional feedback includes information about faces in the search result images other than a face selected by the user as being the same as the query face.

12. The method of claim 1 further comprising:
    accessing a set of images that include faces that have not been labeled;
    sorting the set of images into groups based on the faces within the images, wherein the images in a group include faces that are determined to be the same; and
    accessing the query face after the set of images have been sorted, wherein the query face is a face that is included in an image in one of the groups.

13. The method of claim 1 wherein the search result images comprise images within an online photograph album.

14. The method of claim 13 wherein the indication of the search result images provided to the user is an indication that the search result images have been associated with the query face, wherein the query face is in a labeled image.

15. The method of claim 13 wherein the indication of the search result images provided to the user includes the search result images.

16. The method of claim 1 wherein the search result images comprise images within a social network.

17. A system comprising:
    one or more processors; and
    a memory device that stores instructions, the instructions being executable by the one or more processors to cause the one or more processors to implement:
    a feature extractor configured to:
      access at least one query face,
      create a query feature vector for the query face, and
      form a set of search feature vectors by creating one or more search feature vectors for faces within a set of search faces;
    a face classifier configured to:
      determine distances between the query feature vector and the search feature vectors,
      select one or more search feature vectors that are within a selected distance of the query feature vector, and
      designate images that include faces that correspond to the selected search feature vectors as a set of search result images;
    an interface manager configured to:
      provide an indication of the search result images to a user, and
      receive an indication that the user has caused at least one of the provided search result images to be printed; and
    a feedback manager configured to determine that a face in the printed search result image matches the query face,
    wherein the face classifier is also configured to, update the set of search result images based on the determination that the face in the printed search result image matches the query face.

18. The method of claim 9, wherein inferring additional feedback further includes inferring extra information for the other faces within one or more of the provided search result images for which the user has not provided explicit or implicit feedback.

19. A computer-implemented method for recognizing faces within images, the method comprising:
    accessing at least one query face;
    determining a set of search result images, wherein a search result image includes an application-selected face that is determined to be the same as the query face;
    providing an indication of the search result images to a user;
    receiving an indication that the user has caused at least one of the provided search result images to be downloaded;
    determining that a face in the downloaded search result image matches the query face; and
    updating the set of search result images based on the determination that the face in the downloaded search result image matches the query face.

20. The method of claim 19 wherein determining a set of search result images includes:
    creating a query feature vector for the query face;
    forming a set of search feature vectors by creating one or more search feature vectors for faces within a set of search faces;
    determining distances between the query feature vector and the search feature vectors;

selecting one or more search feature vectors that are within a selected distance of the query feature vector; and designating images that include faces that correspond to the selected search feature vectors as the set of search result images.

21. The method of claim 19, further comprising:

inferring additional feedback based on the determination that the face in the downloaded search result images matches the query face, wherein updating the set of search result images includes updating the set of search result images based on the determination that the face in the downloaded search result images matches the query face and the inferred additional feedback.

22. The method of claim 21, wherein inferring additional feedback further includes inferring extra information for the other faces within one or more of the provided search result images for which the user has not provided explicit or implicit feedback.

23. The method of claim 21 wherein the inferred additional feedback includes information about faces in the search result images other than the face in the downloaded search result.

24. The method of claim 21 wherein the inferred additional feedback includes information about faces in the search result images other than a face selected by the user as being the same as the query face.

25. The method of claim 19 further comprising:

accessing a set of images that include faces that have not been labeled;

sorting the set of images into groups based on the faces within the images, wherein the images in a group include faces that are determined to be the same; and accessing the query face after the set of images have been sorted, wherein the query face is a face that is included in an image in one of the groups.

26. The method of claim 19 wherein the search result images comprise images within an online photograph album.

27. The method of claim 19 wherein the search result images comprise images within a social network.

28. A system for recognizing faces within images, comprising:

a processor; and a memory, wherein the memory stores instructions that, when executed by the processor, cause the processor to perform the operations of:

accessing at least one query face;

determining a set of search result images, wherein a search result image includes an application-selected face that is determined to be the same as the query face;

providing an indication of the search result images to a user;

receiving an indication that the user has caused at least one of the provided search result images to be downloaded;

determining that a face in the downloaded search result image matches the query face; and updating the set of search result images based on the determination that the face in the downloaded search result image matches the query face.

29. The system of claim 28 wherein the memory stores instructions that, when executed by the processor, cause the processor to perform the operations of:

creating a query feature vector for the query face;

forming a set of search feature vectors by creating one or more search feature vectors for faces within a set of search faces;

determining distances between the query feature vector and the search feature vectors;

selecting one or more search feature vectors that are within a selected distance of the query feature vector; and designating images that include faces that correspond to the selected search feature vectors as the set of search result images.

30. The system of claim 29 wherein the memory further stores instructions that, when executed by the processor, cause the processor to perform the operations of:

inferring additional feedback based on the determination that the face in the downloaded search result images matches the query face, wherein updating the set of search result images includes updating the set of search result images based on the determination that the face in the downloaded search result images matches the query face and the inferred additional feedback.

31. The system of claim 30, wherein inferring additional feedback further includes inferring extra information for the other faces within one or more of the provided search result images for which the user has not provided explicit or implicit feedback.

32. The system of claim 30, wherein the inferred additional feedback includes information about faces in the search result images other than the face in the downloaded search result.

33. The system of claim 30, wherein the inferred additional feedback includes information about faces in the search result images other than a face selected by the user as being the same as the query face.

34. The system of claim 28 wherein the memory further stores instructions that, when executed by the processor, cause the processor to perform the operations of:

accessing a set of images that include faces that have not been labeled;

sorting the set of images into groups based on the faces within the images, wherein the images in a group include faces that are determined to be the same; and accessing the query face after the set of images have been sorted, wherein the query face is a face that is included in an image in one of the groups.

35. The system of claim 28, wherein the search result images comprise images within an online photograph album.

36. The system of claim 28 wherein the search result images comprise images within a social network.

37. A computer-readable medium having stored thereon executable instructions that, when executed by at least one processor, cause the at least one processor to perform the following operations:

accessing at least one query face;

determining a set of search result images, wherein a search result image includes an application-selected face that is determined to be the same as the query face;

providing an indication of the search result images to a user;

receiving an indication that the user has caused at least one of the provided search result images to be downloaded;

determining that a face in the downloaded search result image matches the query face; and updating the set of search result images based on the determination that the face in the downloaded search result image matches the query face.

38. The computer-readable medium of claim 37, wherein the instructions, when executed by the at least one processor, further cause the at least one processor to perform the operations of:

creating a query feature vector for the query face;

forming a set of search feature vectors by creating one or more search feature vectors for faces within a set of search faces;
determining distances between the query feature vector and the search feature vectors;
selecting one or more search feature vectors that are within a selected distance of the query feature vector; and
designating images that include faces that correspond to the selected search feature vectors as the set of search result images.

39. The computer-readable medium of claim 37, wherein the instructions, when executed by the at least one processor, further cause the at least one processor to perform the operations of:
inferring additional feedback based on the determination that the face in the downloaded search result images matches the query face,
wherein updating the set of search result images includes updating the set of search result images based on the determination that the face in the downloaded search result images matches the query face and the inferred additional feedback.

40. The computer-readable medium of claim 39, wherein inferring additional feedback further includes inferring extra information for the other faces within one or more of the provided search result images for which the user has not provided explicit or implicit feedback.

41. The computer-readable medium of claim 39, wherein the inferred additional feedback includes information about faces in the search result images other than the face in the downloaded search result.

42. The computer-readable medium of claim 39, wherein the inferred additional feedback includes information about faces in the search result images other than a face selected by the user as being the same as the query face.

43. The computer-readable medium of claim 37, wherein the instructions, when executed by the at least one processor, further cause the at least one processor to perform the operations of:
accessing a set of images that include faces that have not been labeled;
sorting the set of images into groups based on the faces within the images, wherein the images in a group include faces that are determined to be the same; and
accessing the query face after the set of images have been sorted, wherein the query face is a face that is included in an image in one of the groups.

44. The computer-readable medium of claim 37, wherein the search result images comprise images within an online photograph album.

45. The computer-readable medium of claim 37, wherein the search result images comprise images within a social network.

* * * * *